US008558539B2

(12) United States Patent
Matsumoto et al.

(10) Patent No.: US 8,558,539 B2
(45) Date of Patent: Oct. 15, 2013

(54) STROKE AMOUNT DETECTING DEVICE

(75) Inventors: Koichiro Matsumoto, Kyoto (JP); Yoshiyuki Kono, Obu (JP); Hitomi Honda, Kariya (JP)

(73) Assignee: Denso Corporation, Kariya (JP)

( * ) Notice: Subject to any disclaimer, the term of this patent is extended or adjusted under 35 U.S.C. 154(b) by 292 days.

(21) Appl. No.: 13/082,788

(22) Filed: Apr. 8, 2011

(65) Prior Publication Data

US 2011/0248705 A1 Oct. 13, 2011

(30) Foreign Application Priority Data

Apr. 8, 2010 (JP) .................................. 2010-89284

(51) Int. Cl.
*G01B 7/14* (2006.01)
(52) U.S. Cl.
USPC ............... 324/207.2; 324/207.24; 324/207.21
(58) Field of Classification Search
None
See application file for complete search history.

(56) References Cited

U.S. PATENT DOCUMENTS

| 5,313,182 | A | 5/1994 | Blache | |
|---|---|---|---|---|
| 6,211,668 | B1 | 4/2001 | Duesler et al. | |
| 6,586,929 | B1 * | 7/2003 | Luetzow | 324/207.24 |
| 7,893,688 | B2 | 2/2011 | Kawashima et al. | |
| 8,368,391 | B2 * | 2/2013 | Matsumoto et al. | 324/207.24 |
| 2003/0122641 | A1 | 7/2003 | Luetzow | |

FOREIGN PATENT DOCUMENTS

| JP | H06-088702 | 3/1994 |
|---|---|---|
| JP | 7-103107 | 4/1995 |
| JP | 07-103707 | 4/1995 |
| JP | P2006-226816 A | 8/2006 |
| JP | 2008-045919 | 2/2008 |
| JP | P2009-229437 A | 10/2009 |

OTHER PUBLICATIONS

Japanese Office Action dated Feb. 1, 2012, issued in corresponding Japanese Application No. 2010-089284 with English Translation.
Office Action (13 pages) dated Mar. 7, 2013, issued in corresponding Chinese Application No. 201110090294.8 and English translation (16 pages).

* cited by examiner

*Primary Examiner* — Minh N Tang
(74) *Attorney, Agent, or Firm* — Nixon & Vanderhye PC

(57) ABSTRACT

A stroke amount detecting device includes a first magnetic field generation member, a second magnetic field generation member, and a magnetic sensor unit. The first magnetic field generation member and the second magnetic field generation member are opposed to each other with respect to a direction perpendicular to a straight stroking axis of a stroking object, and magnetized in opposite directions. The magnetic sensor unit is movable in an area between the first magnetic field generation member and the second magnetic field generation member, along a straight traveling axis that is parallel to the straight stroking axis relative to the first magnetic field generation member and the second magnetic field generation member in accordance with a stroke motion of the stroking object. The magnetic sensor unit has a magnetosensitive surface facing a direction parallel to the traveling axis, thereby to detect an amount of stroke of the object.

30 Claims, 17 Drawing Sheets

STROKE AMOUNT DETECTING DEVICE

CROSS REFERENCE TO RELATED APPLICATION

This application is based on Japanese Patent Application No. 2010-89284 filed on Apr. 8, 2010, the disclosure of which is incorporated herein by reference.

FIELD OF THE INVENTION

The present invention relates to a stroke amount detecting device for detecting the amount of stroke of a stroking object.

BACKGROUND OF THE INVENTION

In a conventional stroke amount detecting device, a magnetic sensor element moves relative to a magnet as a magnetic field generation member in accordance with a linear movement of a stroking object. The amount of stroke of the object is detected based on an output signal generated from the magnetic sensor element. For example, JP2000-180114A, which corresponds to U.S. Pat. No. 6,211,668, and JP2008-45919A describe inventions for improving linearity of output signals relative to the stroke amount.

In a magnetic position sensor described in JP2000-180114A, tapered magnets are opposed to each other in a direction parallel to a line along which a magnetic sensor element moves. Also, the opposed tapered magnets are provided on both sides of a stroke range of the magnetic sensor element, such as on a first side and a second side of the stroke range. Thus, a distance between the tapered magnets, that is, a width of an air gap between tapered surfaces increases toward a middle position of the stroke range and reduces as a function of distance from the middle position. The tapered magnets on the first side of the stroke range are magnetized in the same direction. Also, the tapered magnets on the second side of the stroke range are magnetized in the same direction, but are magnetized in an opposite direction as the tapered magnets on the first side. In such a construction, a magnetic flux density detected by a magnetic sensor element continuously changes in a manner of strong, weak, strong, as the magnetic sensor element moves relative to the tapered magnets. Further, the directions of the magnetic fluxes are opposite between the first side and the second side.

In a position detection device described in JP2008-45919A, magnets are arranged on both sides of a stroke range, such as on a first side and a second side of the stroke range. Further, on the first side of the stroke range, the magnets are opposed to each other in a direction perpendicular to a stroke direction. Likewise, on the second side of the stroke range, the magnets are opposed to each other in the direction perpendicular to the stroke direction. The opposed magnets are magnetized in the same direction, but the magnets on the first side and the magnets on the second side are magnetized in different directions. Thus, the directions of the magnetic fluxes are opposite between the first side and the second side of the stroke range.

In the magnetic position sensor described in JP2000-180114A, if the magnets are arranged such that the tapered surfaces are unevenly angled relative to a line along which the magnetic sensor element moves due to a machining error or an assembling error, detection errors may occur.

Further, in the case where the magnets opposed in the direction perpendicular to the stroke direction are magnetized in the same direction, as in the magnetic position sensor described in JP2000-180114A and the position detection device described in JP2008-45919A, if the position of the magnetic sensor element is displaced from the stroke direction, such as in the direction perpendicular to the stroke direction, a detecting magnetic flux density varies, resulting in detection errors. Therefore, robustness will be insufficient. That is, a property that a system characteristic maintains a current state against disturbances and errors in designing will be insufficient.

SUMMARY OF THE INVENTION

The present invention is made in view of the foregoing matter, and it is an object to provide a stroke amount detecting device with sufficient robustness.

According to an aspect of the present invention, a stroke amount detecting device includes a first magnetic field generation member, a second magnetic field generation member and a magnetic sensor unit. The second magnetic field generation member opposed to the first magnetic field generation member with respect to a direction perpendicular to a straight stroking axis along which an object strokes. The second magnetic field generation member and the first magnetic field generation member are magnetized in opposite directions with respect to a direction perpendicular to the stroking axis. The magnetic sensor unit is movable in an area between the first magnetic field generation member and the second magnetic field generation member, along a straight traveling axis that is parallel to the straight stroking axis, relative to the first magnetic field generation member and the second magnetic field generation member in accordance with a stroke motion of the object. The magnetic sensor unit has a magnetosensitive surface facing a direction parallel to the traveling axis for detecting an amount of stroke of the object.

In such a configuration, the first magnetic field generation member and the second magnetic field generation member are magnetized in opposite directions. That is, the first magnetic field generation member and the second magnetic field generation member are magnetized such that opposed sides thereof have the same magnetic pole. As such, magnetic fluxes are repelled between the first magnetic field generation member and the second magnetic field generation member, and hence vectors of the magnetic fluxes are uniform along the traveling axis, that is, in a stroke direction. In addition, the magnetosensitive surface of the magnetic sensor unit faces the direction along the traveling axis, uniform magnetic fluxes are detected. Therefore, even if the magnetic sensor unit is displaced in a direction perpendicular to the traveling axis, a magnetic flux density detected by the magnetic sensor unit will not be affected. Accordingly, robustness of the stroke amount detecting device improves.

According to another aspect of the present invention, a stroke amount detecting device includes a first magnetic field generation member, a second magnetic field generation member, a third magnetic field generation member, a fourth magnetic field generation member and a magnetic sensor unit. The second magnetic field generation member is opposed to the first magnetic field generation member with respect to a direction perpendicular to a straight stroking axis along which an object strokes. The first magnetic field generation member and the second magnetic field generation member are magnetized in opposite directions with respect to a direction perpendicular to the stroking axis. The third magnetic field generation member is spaced from the first magnetic field generation member by a predetermined distance with respect to a direction parallel to the stroking axis. The third magnetic field generation member is magnetized in an identical direction to the first magnetic field generation member with respect to the direction perpendicular to the stroking axis. The fourth magnetic field generation member is spaced from the second magnetic field generation member by a predetermined distance with respect to the direction parallel to the stroking axis, and opposed to the third magnetic field generation member with respect to the direction perpendicular to the stroking axis. The fourth magnetic field generation member is magnetized in an identical direction to the second magnetic field generation member with respect to the direction perpendicular to the stroking axis. The magnetic sensor unit is movable in an area between the first magnetic field generation member, the second magnetic field generation member, the third magnetic field generation member and the fourth magnetic field generation member, along a straight traveling axis that is parallel to the stroking axis, relative to the first magnetic field generation member, the second magnetic field generation member, the third magnetic field generation member and the fourth magnetic field generation member in accordance with a stroke motion of the object. The magnetic sensor unit includes a magnetosensitive surface facing a direction parallel to the traveling axis for detecting an amount of stroke of the object.

In such a configuration, the first magnetic field generation member and the second magnetic field generation member are magnetized in opposite directions with respect to the direction perpendicular to the traveling axis. Likewise, the third magnetic field generation member and the fourth magnetic field generation member are magnetized in opposite directions with respect to the direction perpendicular to the traveling axis. As such, magnetic fluxes are repelled between the first magnetic field generation member and the second magnetic field generation member, and hence vectors of the magnetic fluxes are uniform along the traveling axis. Also, magnetic fluxes are repelled between the third magnetic field generation member and the fourth magnetic field generation member, and hence vectors of the magnetic fluxes are uniform along the traveling axis. In addition, the magnetosensitive surface of the magnetic sensor unit faces the direction along the traveling axis. Therefore, even if the magnetic sensor unit is displaced in a direction perpendicular to the traveling axis, a magnetic flux density detected by the magnetic sensor unit will not be affected. Accordingly, robustness of the stroke amount detecting device improves.

For example, linearity of the magnetic flux density to be detected by the magnetic sensor unit relative to an amount of stroke can be improved by adjusting arrangement positions of the first through fourth magnetic field generation members. That is, the linearity can be ensured by a magnetic circuit.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

Hereinafter, exemplary embodiments of the present invention will be described with reference to the accompanying drawings. Like parts are designated by like reference numbers throughout the exemplary embodiments, and a description thereof will not be repeated.

First Embodiment

A stroke amount detecting device according to a first embodiment is employed to detect the amount of stroke of a stroking object. For example, the stroke amount detecting device is employed to detect the stroke amount of a stroking member, such as a transmission, an acceleration pedal, or a brake pedal of a vehicle.

Figure 2:
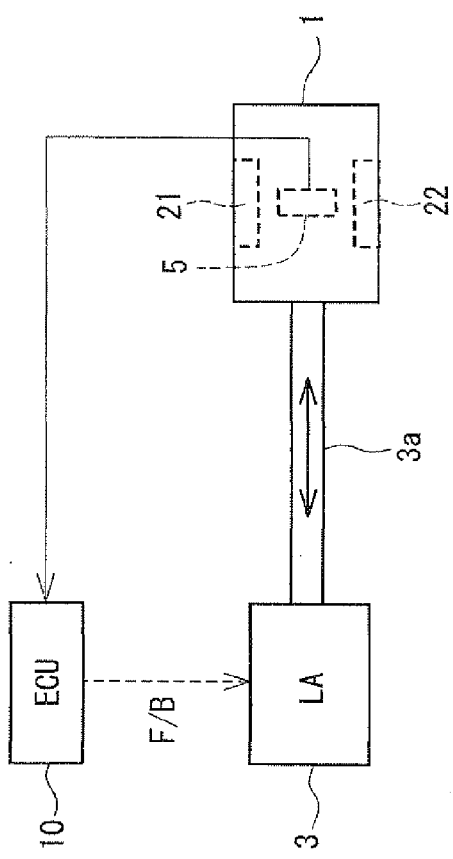
FIG. 2 is a schematic diagram of a system employing the stroke amount detecting device according to the first embodiment.

Referring to FIG. 2, a stroke amount detecting device 1 according to the first embodiment generally includes first and second magnets 21, 22 as examples of first and second magnetic field generation members, and a Hall element 5 as an example of a first sensor element. The Hall element 5 moves relative to the first and second magnets 21, 22 in accordance with a linear movement of a stroking member 3a of a linear actuator 3 so as to detect the stroke amount.

The detected stroke amount is sent to an engine control unit (ECU) 10. The ECU 10 utilizes the detected stroke amount to perform a feedback control of the linear actuator 3.

Figure 1:
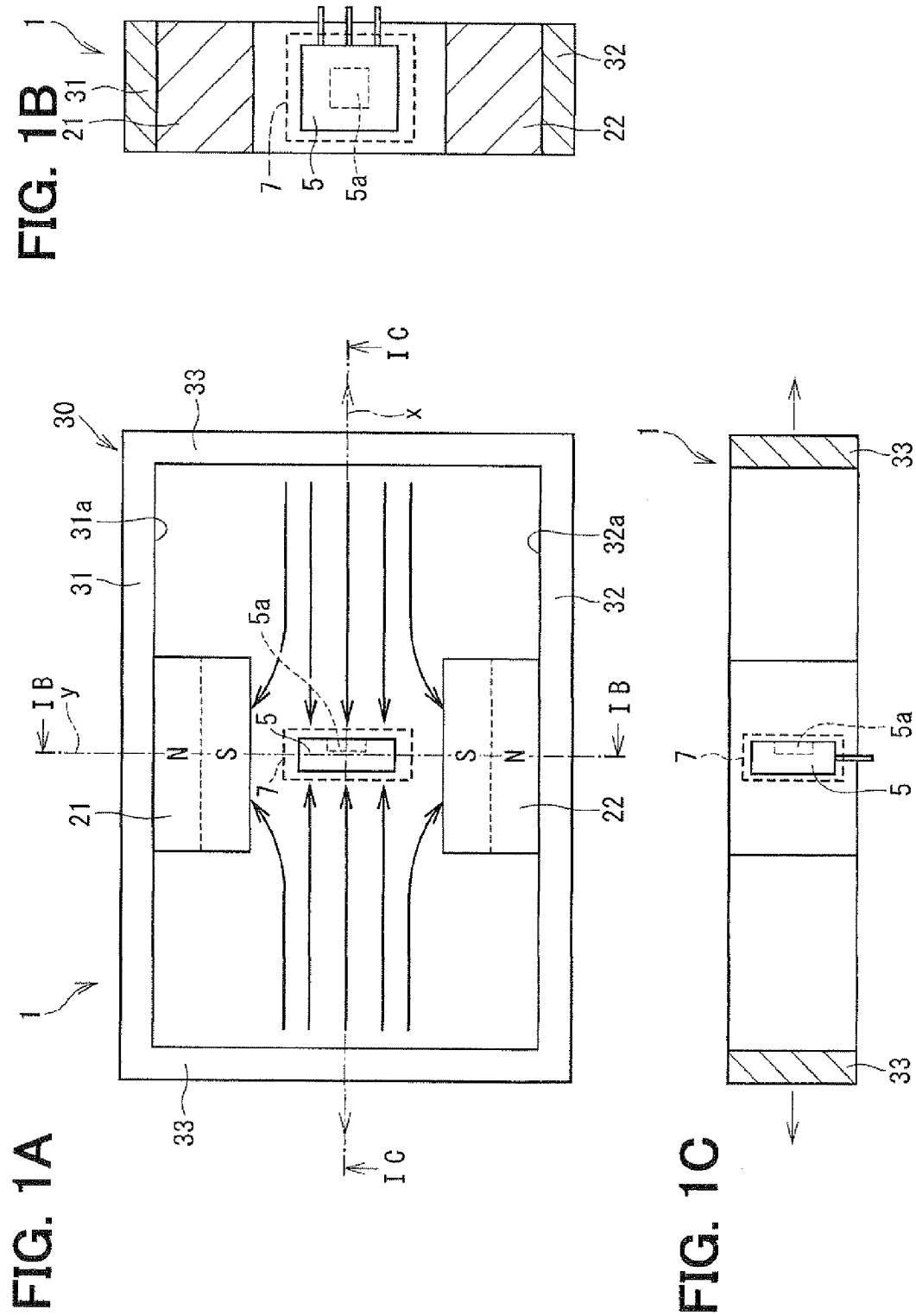
FIG. 1A is a schematic view of a stroke amount detecting device according to a first embodiment of the present invention.
FIG. 1B is a cross-sectional view taken along a line IB-IB in FIG. 1A.
FIG. 1C is a cross-sectional view taken along a line IC-IC in FIG. 1A.

Next, a structure of the stroke amount detecting device 1 will be described with reference to FIGS. 1A through 1C.

The stroke amount detecting device 1 includes the first and second magnets 21, 22, the Hall element 5 and a yoke 30 as an example of a magnetic flux transmission member. The first magnet 21 and the second magnet 22 have the same shape and the same magnetic property. For example, each of the first magnet 21 and the second magnet 22 have a rectangular parallelepiped shape.

The yoke 30 is made of a magnetic material such as steel. The yoke 30 has a rectangular frame shape including a first main wall (first wall) 31, a second main wall (second wall) 32, and two side walls 33 connecting the first main wall 31 and the second main wall 32. For example, the yoke 30 has a rectangular cross-section.

The first magnet 21 is disposed along an inner surface 31a of the first main wall 31 and at a middle position of the first main wall 31 with respect to a longitudinal direction of the first main wall 31. The second magnet 22 is disposed along an inner surface 32a of the second main wall 32 and at a middle position of the second main wall 32 with respect to a longitudinal direction of the second main wall 32.

The first magnet 21 is disposed such that a north pole is adjacent to the inner surface 31a. The second magnet 22 is disposed such that a north pole is adjacent to the inner surface 32a. Thus, a south pole of the first magnet 21 is opposed to a south pole of the second magnet 22. That is, the first magnet 21 and the second magnet 22 are magnetized in opposite directions to each other.

The Hall element 5 is located in an area between the first magnet 21 and the second magnet 22. The Hall element 5 moves in a right and left direction of FIG. 1A relative to the first and second magnets 21, 22 in accordance with the linear movement of the stroking member 3a.

Hereinafter, a direction in which the stroking member 3a moves in a linear manner is referred to as the stroke direction. Also, a straight line along which the stroking member 3a moves is referred to as a straight stroking axis. The stroke direction corresponds to a direction along an X axis in FIG. 1A. The stroke direction, that is, the direction along the X axis is referred to as the X direction. Also, a direction perpendicular to the stroke direction, that is, an up and down direction in FIG. 1A is referred to as the Y direction. Further, a straight line along which the Hall element 5 moves relative to the first and second magnets 21, 22 is denoted by the X axis. The X axis corresponds to a straight traveling axis or a translation axis of the Hall element 5.

A straight line that passes through the middle position of the first main wall 31 and the middle position of the second main wall 32 and perpendicularly intersects the X axis is denoted by a Y axis. An intersection point of the X axis and the Y axis corresponds to a zero point of the stroke amount, that is, a point where the stroke amount is zero. The stroke amount when the Hall element 5 is moved to a first side, such as a right side in FIG. 1A, from the Y axis is indicated by a positive value. The stroke amount when the Hall element 5 is moved to a second side, such as a left side in FIG. 1A, from the Y axis is indicated by a negative value.

Since the first magnet 21 and the second magnet 22 are arranged such that the south poles thereof are opposed to each other, magnetic fluxes are repelled in the Y direction. Thus, vectors of the magnetic fluxes are uniform along the X direction.

The Hall element 5a is disposed such that a magnetosensitive surface 5a faces in the X direction. Thus, the magnetosensitive surface 5a detects a uniform magnetic flux density.

Figure 3:
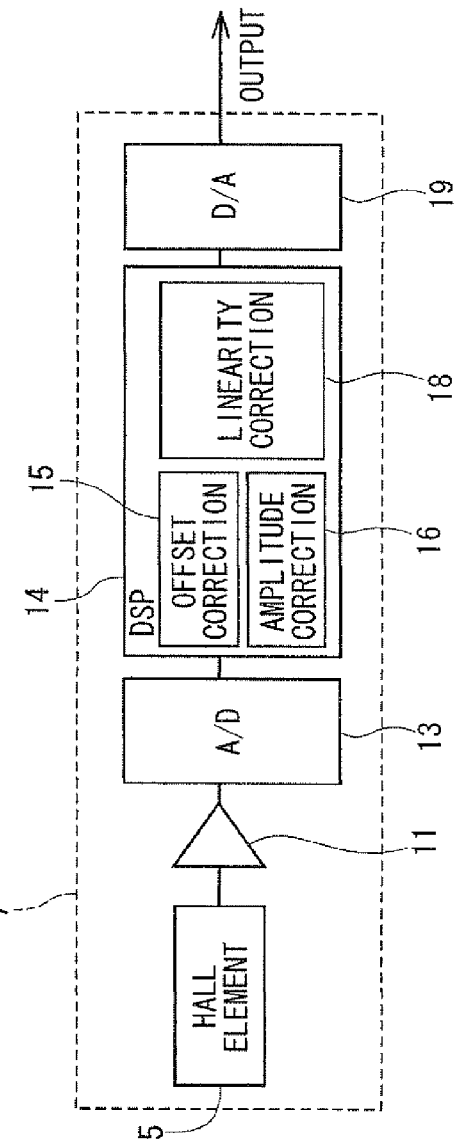
FIG. 3 is a schematic block diagram of a circuit of a Hall IC chip of the stroke amount detecting device according to the first embodiment.

The Hall element 5 is mounted in a Hall IC chip 7 as an example of a magnetic sensor unit. As shown in FIG. 3, the Hall IC chip 7 includes the Hall element 5, an amplifier circuit 11 for amplifying an output signal of the Hall element 5, an A/D converter circuit 13 for converting an amplified analog signal to a digital signal, a signal processing part 14 for processing the digital signal, a D/A converter circuit 19 for converting a digital value outputted from the signal processing part 14 into an analog value, and the like. The Hall IC chip 7 corresponds to a semiconductor chip.

The signal processing part 14 is, for example, constructed of a digital signal processor (DSP), and includes an offset correction circuit 15, an amplitude correction circuit 16, a linearity correction circuit 18 and the like. The linearity correction circuit 18 corrects the output signal of the Hall element 5 to be proportional to the stroke amount. That is, the linearity correction circuit 18 corrects linearity of the output signal of the Hall element 5, so that the output signal varies linearly relative to the amount of stroke. The linearity correction circuit 18 serves as a linearity correction section.

Next, an operation of the stroke amount detecting device 1 will be described.

Figure 4A:
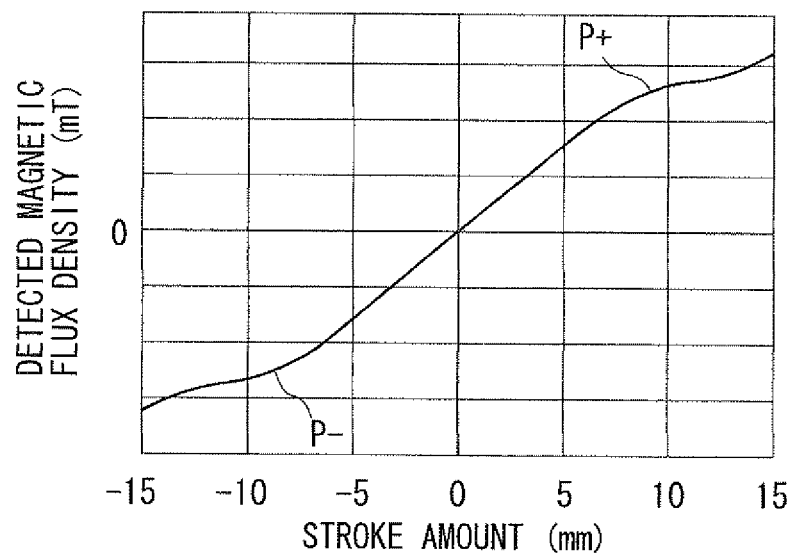
FIG. 4A is a graph showing a magnetic flux density detected by a Hall element of the stroke amount detecting device according to the first embodiment.

As the Hall element 5 moves relative to the first and second magnets 21, 22 in accordance with the linear movement of the stroking member 3a, the magnetic flux density detected by the magnetosensitive surface 5a varies as shown by a curve in FIG. 4A.

Figure 4B:
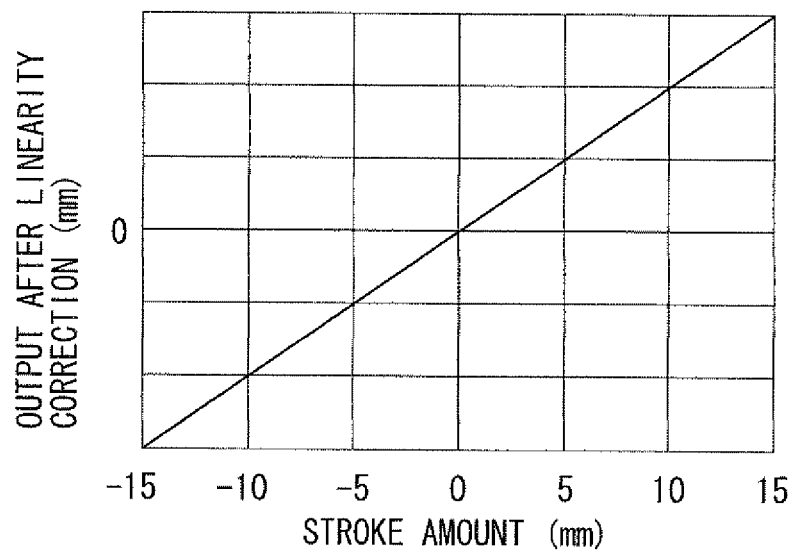
FIG. 4B is a graph showing an output generated by correcting linearity of a detected magnetic flux density shown in FIG. 4A according to the first embodiment.

As shown by the curve in FIG. 4A, linearity of the detected magnetic flux density is degraded at a "p+" portion and a "p−" portion, which correspond to opposite ends of a stroke range. The linearity correction circuit 18 corrects the linearity of the detected magnetic flux density, as shown in FIG. 4B. FIG. 4B shows an output after the linearity correction by the linearity correction circuit 18.

The first embodiment achieves the following advantageous effects (1) through (8):

(1) The magnetic fluxes are repelled between the first magnet 21 and the second magnet 22 since the south poles of the first magnet 21 and the second magnet 22 are opposed to each other. Thus, the vectors of the magnetic fluxes are uniform along the stroke direction. Further, since the magnetosensitive surface 5a of the Hall element 5 faces a direction along the stroke direction, the Hall element 5 can detect the uniform magnetic flux density. Therefore, even if a position of the Hall element 5 is displaced with respect to the Y direction, the magnetic flux density to be detected hardly changes. As such, robustness of the stroke amount detecting device 1 improves.

(2) The Hall element 5 moves on a straight line that is equidistant from the first magnet 21 and the second magnet 22 and at which the vectors of the magnetic fluxes are most uniform, relative to the first magnet 21 and the second magnet 22. Therefore, the robustness of the stroke amount detecting device 1 to a positional displacement further improves.

(3) Since the yoke 30 is employed, magnetic circuit permeance increases. Therefore, demagnetization of the first and second magnets 21, 22 is restricted. Further, because the magnetic flux density detected by the Hall element 5 increases, an SN ratio improves. Furthermore, because a shield effect improves, strength of the stroke amount detecting device 1 against disturbance due to other magnetic fields and approach of magnetic members improves. In addition, the yoke 30 has the side walls 33. Therefore, as compared with a yoke without having the side walls 33, the shield effect further improves, and hence the strength against the disturbance improves. Further, since the vectors of the magnetic fluxes are further uniform, the robustness of the stroke amount detecting device 1 further improves.

(4) The first magnet 21 and the second magnet 22 are respectively located at the middle position of the first main wall 31 and the second main wall 32, with respect to the X direction. Further, the magnetic flux density is zero at a middle position between the first magnet 21 and the second magnet 22, that is, at the intersection point of the X axis and the Y axis. The magnetic flux density varies as a point symmetric with respect to the zero point such that the magnetic flux density becomes the positive value on the first side and the negative value on the second side.

It is to be noted that the detected magnetic flux density is affected by the temperature in a region where the magnetic flux density is not zero, and is not affected by the temperature at a point where the magnetic flux density is zero. Therefore, the point where the magnetic flux density is zero is preferable as a reference point of the stroke amount. Since the first magnet 21 and the second magnet 22 are arranged in the above-described manner, the reference point of the stroke range is adjusted to the point where the magnetic flux density is zero. Accordingly, the stroke range can be effectively and widely set.

(5) Since the first magnet 21 and the second magnet 22 have the same shape and the same magnetic property, the vectors of the magnetic fluxes are further uniform. Thus, the robustness of the stroke amount detecting device 1 to the positional displacement improves. In addition, manufacturing efficiency in view of parts control and assembling process improves.

(6) Each of the first magnet 21 and the second magnet 22 has a rectangular parallelepiped shape. Since the first magnet 21 and the second magnet 22 have a simple shape, unevenness caused in a machining process and/or an assembling process reduces. With this, the vectors of the magnetic fluxes are further uniform, and hence the robustness to the positional displacement improves. Moreover, since the first magnet 21 and the second magnet 22 have the simple shape, manufacturing costs reduce.

(7) The linearity correction circuit 18 corrects the linearity of the magnetic flux density detected by the Hall element 5. In other words, linearity is not highly required in the magnetic flux density detected by the Hall element 5. Therefore, the shape and the arrangement of the first magnet 21 and the second magnet 22 can be simplified.

(8) The Hall element 5 and the linearity correction circuit 18 are included in the single Hall IC chip 7. Therefore, an overall size of the magnetic sensor unit reduces, and hence mountability of the magnetic sensor unit improves.

Second Embodiment

A second embodiment will be described with reference to FIGS. 5 and 6.

Figure 5:
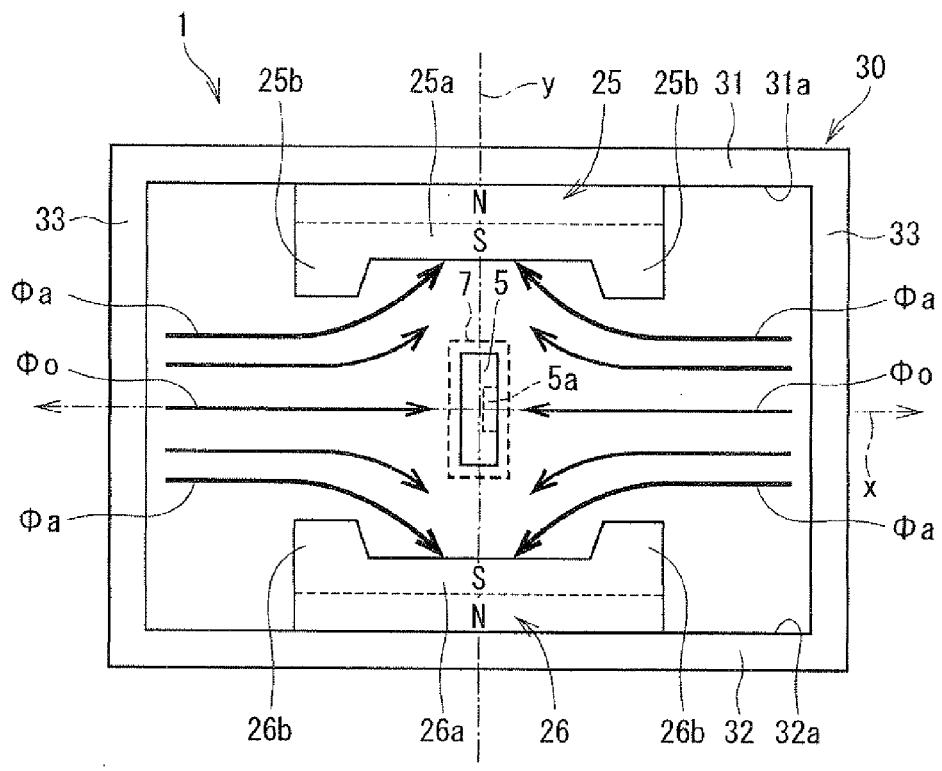
FIG. 5 is a schematic view of a stroke amount detecting device according to a second embodiment of the present invention.

Referring to FIG. 5, the stroke amount detecting device 1 according to the second embodiment has a first magnet 25 and a second magnet 26, in place of the first magnet 21 and the second magnet 22 of the first embodiment. Each of the first magnet 25 and the second magnet 26 has a depressed shape including a thin portion 25a, 26a and thick portions 25b, 26b at opposite sides of the thin portion 25a, 26a.

The thin portion 25a is provided at a middle position of the stroke range, that is, in a range including the Y axis. The thick portions 25b are provided at opposite sides of the thin portion 25a with respect to the stroke direction. Each of the thick portions 25b has a thickness greater than the thickness of the thin portion 25a with respect to the Y direction. Thus, a distance between a surface of the thick portion 25b and the X axis is less than a distance between a surface of the thin portion 25a and the X axis.

Likewise, the thin portion 26a is provided at a middle position of the stroke range, that is, in a range including the Y axis. The thick portions 26b are provided at opposite sides of the thin portion 26a with respect to the stroke direction. Each of the thick portions 26b has a thickness greater than the thickness of the thin portion 26a with respect to the Y direction. Thus, a distance between a surface of the thick portion 26b and the X axis is less than a distance between a surface of the thin portion 26a and the X axis.

Figure 6:
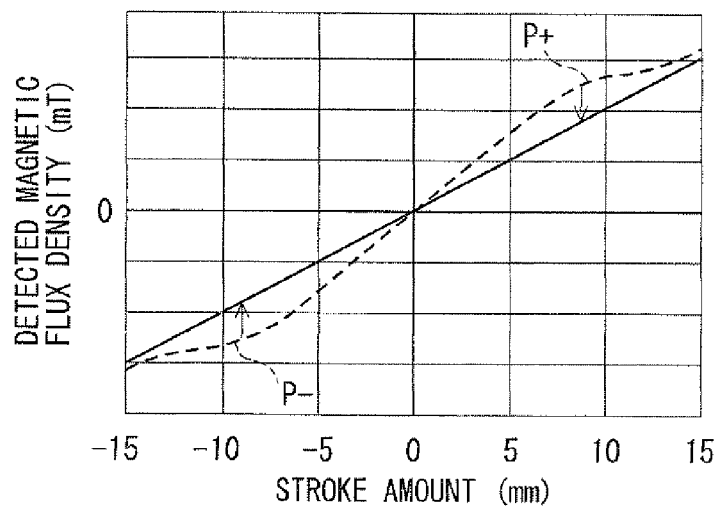
FIG. 6 is a graph showing a magnetic flux density detected by a Hall element of the stroke amount detecting device according to the second embodiment.

A magnetic flux density detected by the Hall element 5 of the second embodiment is shown by a solid line in FIG. 6. In the first embodiment, the linearity of the detected magnetic flux density is degraded, for example, at the end portions of the stroke range, such as the "p+" portion and the "p−" portion, as shown by a dashed line in FIG. 6.

In the second embodiment, on the other hand, a curve of the magnetic flux density corresponding to the thin portions 25a, 26a (curved portions between the "p−" portion and the "p+" portion) can be reduced, as compared with the magnetic flux density corresponding to thick portions 25b, 26b (a range equal to or lower than the "p−" portion and a range equal to or higher than the "p+" portion). That is, by adjusting the range of the thin portion 25a, 26a and/or the difference in thickness between the thin portion 25a, 26a and the thick portions 25b, 26b, the change in the magnetic flux density relative to the stroke amount can be adjusted linearly as shown by the solid line in FIG. 6. In other words, the linearity can be ensured by the magnetic circuit.

In the second embodiment, the advantageous effects similar to the first embodiment can be also achieved.

Third Embodiment

A third embodiment will be described with reference to FIGS. 7, 8A and 8B. In the stroke amount detecting device 1 according to the third embodiment, as shown in FIG. 7, the first magnet 21 and the second magnet 22 are offset from the Y axis to a negative side of the stroke direction, that is, to a left side in FIG. 7.

For example, in a case where the stroke range of the stroking object is biased toward the negative side from the reference point, the first magnet 21 and the second magnet 22 are arranged on the negative side to be adjacent to the center of the stroke range. Thus, an accurate range can be selectively utilized as centering the point where the magnetic flux density is zero.

Figure 7:
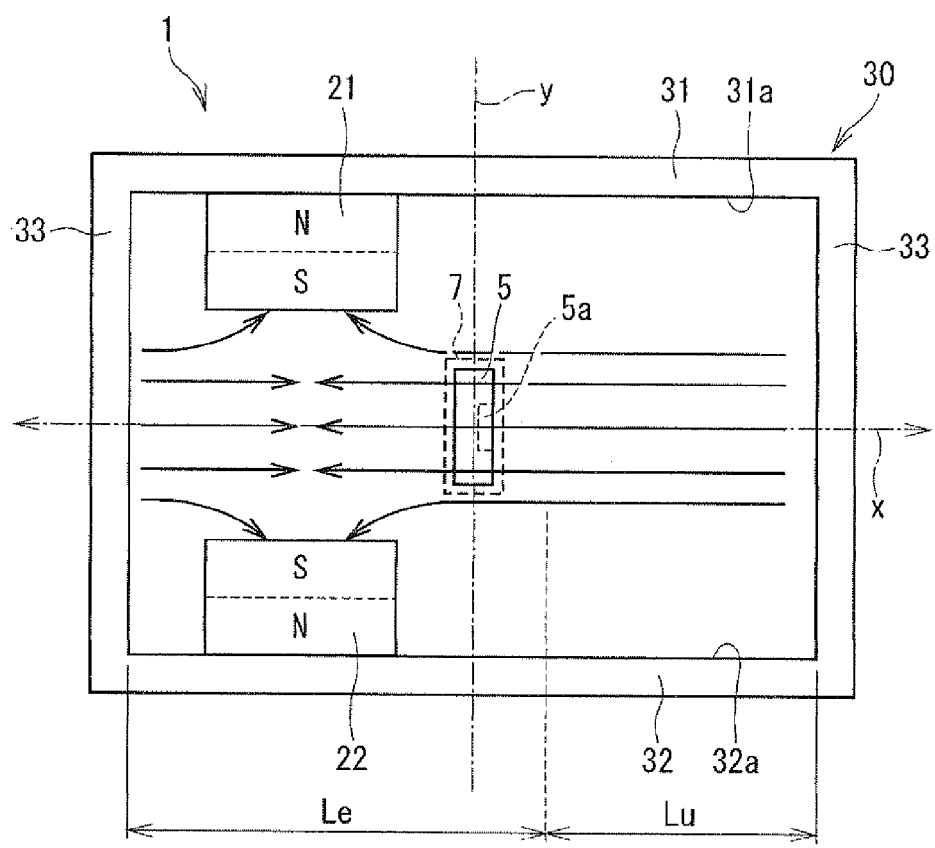
FIG. 7 is a schematic view of a stroke amount detecting device according to a third embodiment of the present invention.
Figure 8A:
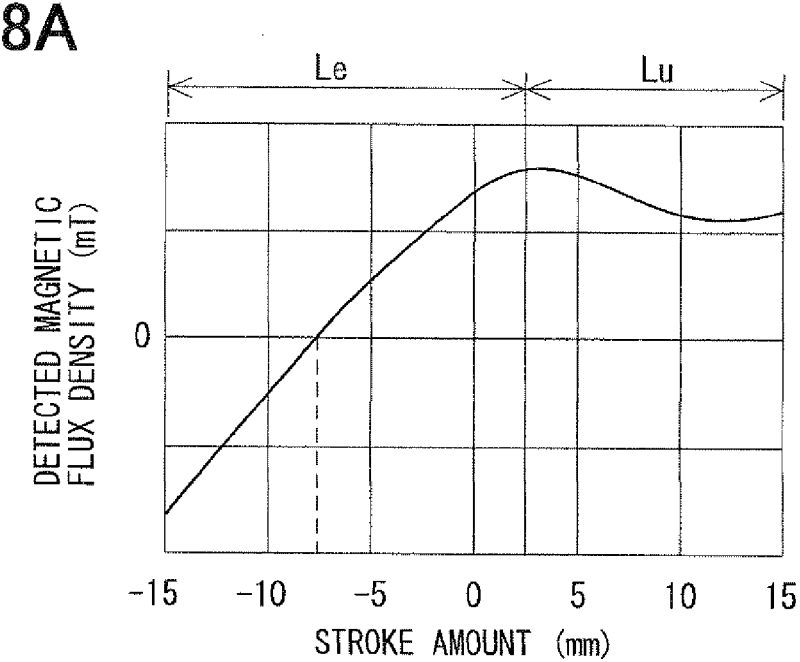
FIG. 8A is a graph showing a magnetic flux density detected by a Hall element of the stroke amount detecting device according to the third embodiment.
Figure 8B:
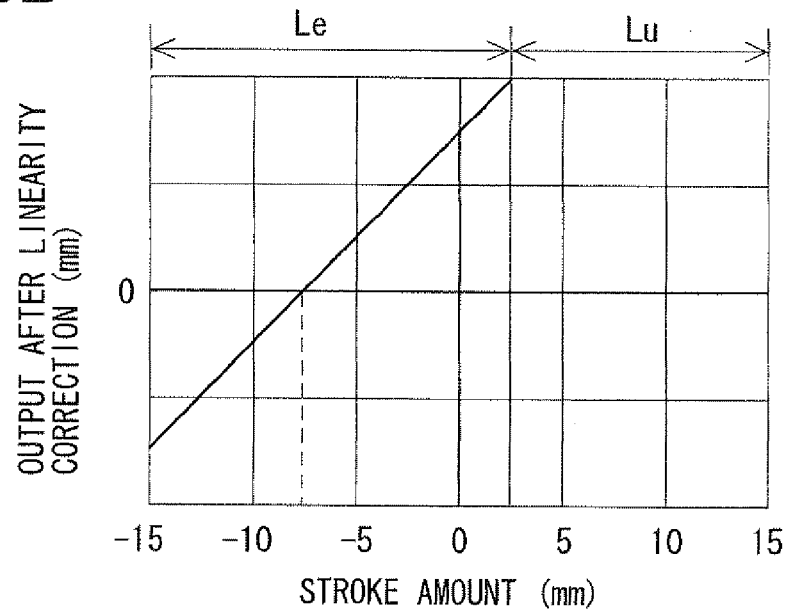
FIG. 8B is a graph showing an output generated by correcting linearity of a detected magnetic flux density shown in FIG. 8A according to the third embodiment.

In FIG. 7, an arrow Le represents a detectable range (detection available range) in which the magnetic flux density can be detected by the Hall element 5 and an arrow Lu represents an undetectable range in which the magnetic flux density cannot be detected by the Hall element 5. As shown in FIG. 8A, the detected magnetic flux density does not change in the undetectable range Lu. As shown in FIG. 8B, linearity of the magnetic flux density detected in the detectable range Le is corrected.

In the third embodiment, the advantageous effects similar to the first embodiment can be also achieved.

Fourth Embodiment

A fourth embodiment of the present invention will be described with reference to FIGS. 9, 10A and 10B.

Figure 9:
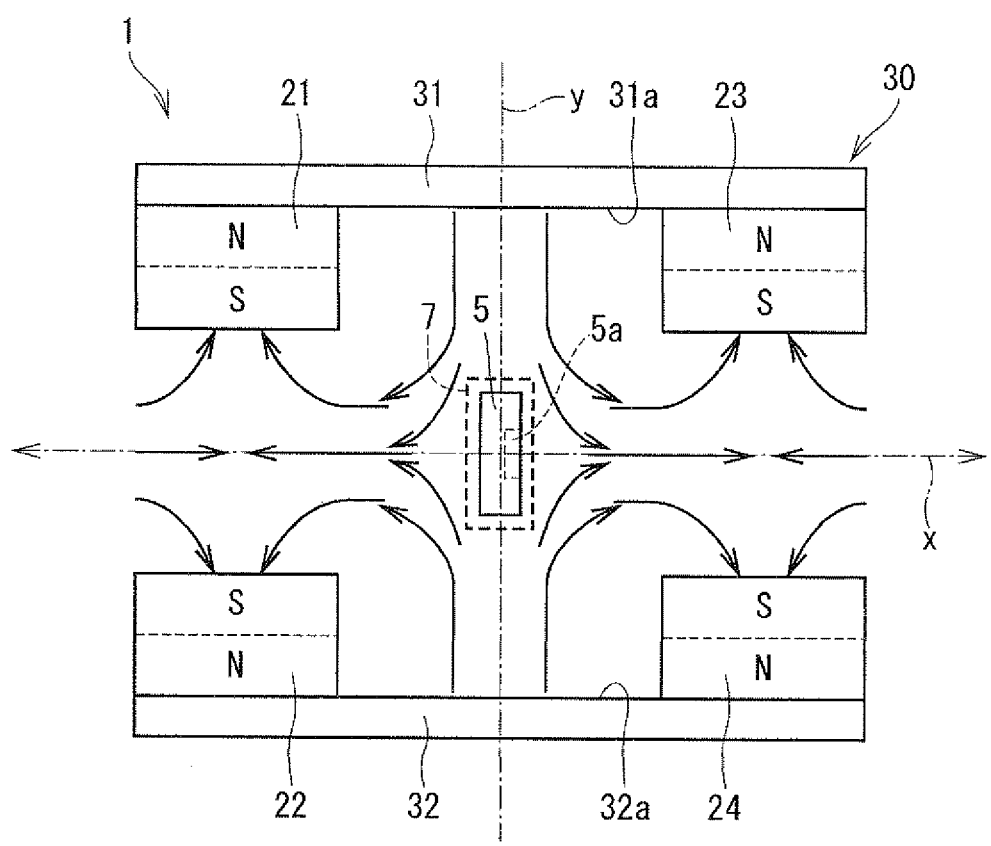
FIG. 9 is a schematic view of a stroke amount detecting device according to a fourth embodiment of the present invention.

Referring to FIG. 9, the stroke amount detecting device 1 of the fourth embodiment includes four magnetic field generation members, such as a first magnet 21, a second magnet 22, a third magnet 23 and a fourth magnet 24. The four magnets 21 through 24 have the same shape and the same magnetic property. For example, each of the magnets 21 through 24 has a rectangular parallelepiped shape.

The first magnet 21 and the second magnet 22 are arranged on the negative side of the X direction, that is, on the left side of the Y axis in FIG. 9. The first magnet 21 and the second magnet 22 are arranged symmetric with respect to the X axis such that the south pole of the first magnet 21 is opposed to the south pole of the second magnet 22.

The third magnet 23 and the fourth magnet 24 are arranged on the positive side of the X direction, that is, on the right side of the Y axis in FIG. 9. The third magnet 23 and the fourth magnet 24 are arranged symmetric with respect to the X axis such that the south pole of the third magnet 23 is opposed to the south pole of the fourth magnet 24.

The third magnet 23 is spaced from the first magnet 21 by a predetermined distance in the X direction. The fourth magnet 24 is spaced from the second magnet by the predetermined distance in the X direction. The first through fourth magnets 21 through 24 are equidistant from the X axis with respect to the direction parallel to the Y axis.

The yoke 30, which is made of the magnetic material, such as steel, has the first wall 31 and the second wall 32. The first wall 31 and the second wall 32 are parallel to the X axis. The first magnet 21 and the third magnet 23 are arranged adjacent to opposite ends of the first wall 31 along the inner surface 31a of the first wall 31. The first magnet 21 and the third magnet 23 are arranged symmetric with respect to the Y axis. The second magnet 22 and the fourth magnet 24 are arranged adjacent to opposite ends of the second wall 32, along the inner surface 32a of the second wall 32. The second magnet 22 and the fourth magnet 24 are arranged symmetric with respect to the Y axis. The Y axis corresponds to a straight line that passes through the middle position of the first wall 31 with respect to the stroke direction and the middle position of the second wall 32 with respect to the stroke direction.

The Hall element 5 moves along the X axis relative to the first through fourth magnets 21 through 24, in accordance with the linear movement of the stroking member 3a. The Hall element 5 is provided with the magnetosensitive surface 5a on one side facing a direction along the stroke direction to detect the stroke amount of the stroking member.

The following advantageous effects (1) through (6) are achieved by the fourth embodiment.

(1) The first magnet 21 and the second magnet 22 are arranged such that the south poles thereof are opposed to each other. Likewise, the third magnet 23 and the fourth magnet 24 are arranged such that the south poles thereof are opposed to each other. Therefore, the magnetic fluxes are repelled between the first magnet 21 and the second magnet 22 and between the third magnet 23 and the fourth magnet 24, and thus vectors of the magnetic fluxes are uniform in the stroke direction. Further, the magnetosensitive surface 5a of the Hall element 5 is disposed to face in the direction along the stroke direction. As such, the uniform magnetic flux density can be detected. Therefore, even if the position of the Hall element 5 is displaced in the Y direction, the detected magnetic flux density hardly varies. Accordingly, robustness of the stroke amount detecting device 1 improves.

Figure 10A:
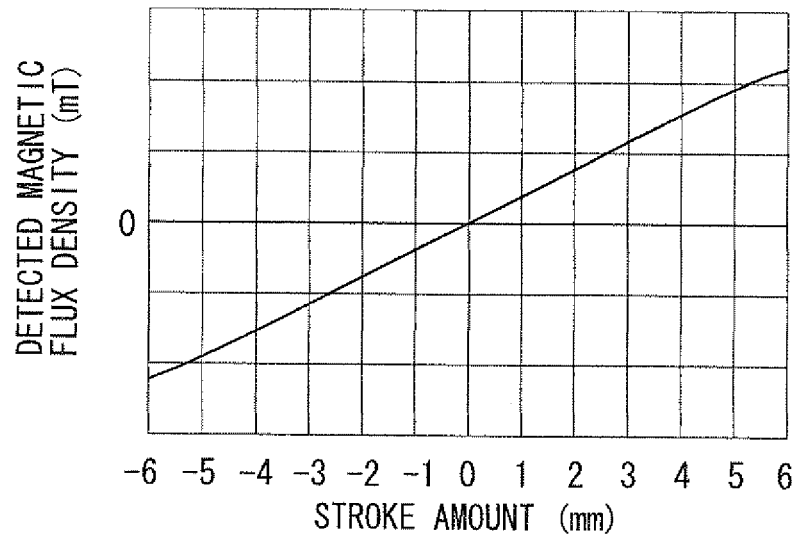
FIG. 10A is a graph showing a magnetic flux density detected by a Hall element of the stroke amount detecting device according to the fourth embodiment.
Figure 10B:
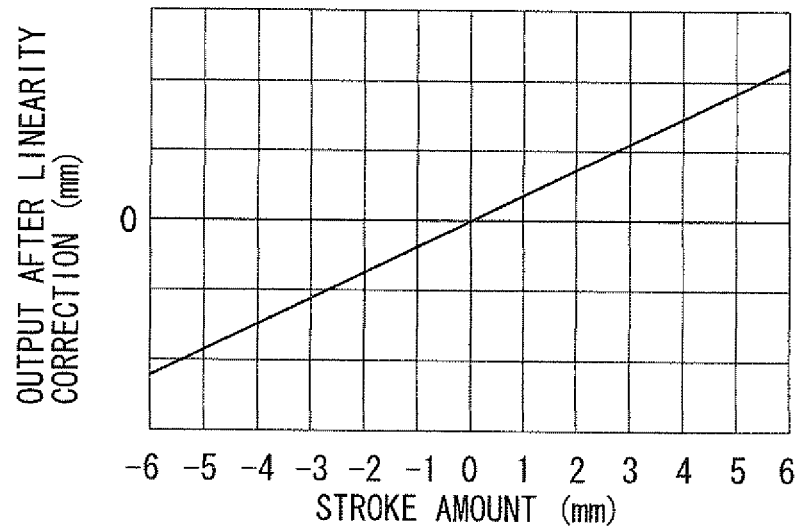
FIG. 10B is a graph showing an output generated by correcting linearity of a detected magnetic flux density shown in FIG. 10A according to the fourth embodiment.

In addition, as shown in FIG. 10A, the linearity of the detected magnetic flux density relative to the stroke amount is effectively improved by adjusting the arrangement positions of the four magnets 21 through 24, as compared with the structure of the first embodiment. That is, the linearity is ensured by the magnetic circuit.

(2) The Hall element 5 moves on the straight line that is equidistant from the first and second magnets 21, 22 and the third and fourth magnets 23, 24 relative to the first through fourth magnets 21 through 24. Therefore, robustness of the stroke amount detecting device 1 to the positional displacement further improves.

(3) Since the yoke 30 is employed, the magnetic circuit permeance increases. With this, demagnetization of the first through fourth magnets 21 through 24 is restricted. Also, the magnetic flux density detected by the Hall element 5 is increased. Thus, the SN ratio improves. In addition, since the shield effect improves, the strength of the stroke amount detecting device 1 against disturbance due to other magnetic fields and approach of magnetic members increases.

(4) The first through fourth magnets 21 through 24 are arranged symmetric with respect to the Y axis, and adjacent to the ends of the first and second walls 31, 32 of the yoke 30. With respect to the Y direction, the magnetic fluxes are repelled between the first magnet 21 and the second magnet 22, and between the third magnet 23 and the fourth magnet 24. With respect to the X direction, the magnetic fluxes are repelled between the first magnet 21 and the third magnet 23, and between the second magnet 22 and the fourth magnet 24.

As such, the magnetic flux density is zero at the center of the first through fourth magnets 21 through 24, that is, at the intersection point between the X axis and the Y axis. The magnetic flux density varies in such a symmetrical manner that the magnetic flux density becomes the positive value on one side of the stroke range and the negative value on the other side of the stroke range.

In the region where the magnetic flux density is not zero, the detected magnetic flux density is affected by the temperature. On the other hand, at the point where the magnetic flux density is zero, the magnetic flux density is not affected by the temperature. Therefore, it is preferable to set the point where the magnetic flux density is zero as the reference point of the stroke amount. By arranging the first through fourth magnets 21 through 24 in the above-described manner, the reference point of the stroke range is adjusted to the point where the magnetic flux density is zero. Accordingly, the stroke range can be effectively and widely set.

(5) The first through fourth magnets 21 through 24 have the same shape and the same magnetic property. Therefore, the vectors of the magnetic fluxes are further uniform, and the robustness of the stroke amount detecting device 1 to the positional displacement improves. Accordingly, manufacturing efficiency in view of the parts control and the assembling process improves.

(6) Each of the first through fourth magnets 21 through 24 have the rectangular parallelepiped shape. Since the magnets 21 through 24 have the simple shape, unevenness caused in the machining process and the assembling process is reduced. Accordingly, the vectors of the magnetic fluxes are further uniform, and the robustness of the stroke amount detecting device 1 to the positional displacement improves. Since the magnets 21 through 24 have the simple shape, the manufacturing costs reduce.

Comparative Example

Next, a comparative example will be described with reference to FIG. 19.

Figure 19:
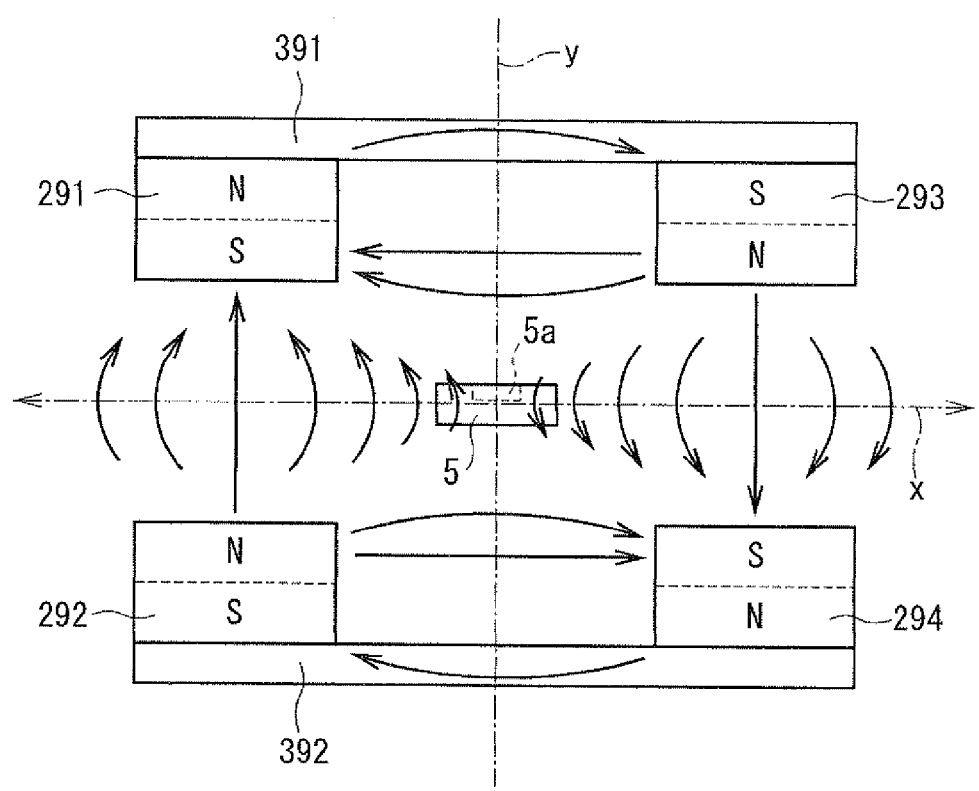
FIG. 19 is a schematic view of a stroke amount detecting device as a comparative example to the fourth embodiment.

In the comparative example shown in FIG. 19, a first magnet 291, a second magnet 292, a third magnet 293 and a fourth magnet 294 are arranged adjacent to ends of two parallel walls 391, 392, which are made of a magnetic material, similar to the fourth embodiment. However, the first through fourth magnets 291 through 294 are magnetized differently from the first through fourth magnets 21 through 24 of the fourth embodiment, and the magnetosensitive surface 5a of the Hall element 5 is arranged in different manner from that of the fourth embodiment.

Specifically, the first magnet 291 and the second magnet 292, which are arranged at left ends of the walls 391, 392, are magnetized in the same direction. The third magnet 293 and the fourth magnet 294, which are arranged at right ends of the walls 391, 392, are magnetized in the same direction, but in an opposite direction to the first and second magnets 291, 292. That is, the first and second magnets 291, 292 are magnetized such that upper portions thereof correspond to the north pole, and the third and fourth magnets 293, 294 are magnetized such that upper portions thereof correspond to the south pole. The Hall element 5 is arranged such that the magnetosensitive surface 5a faces a direction along the Y direction.

In the comparative example shown in FIG. 19, repelling magnetic fluxes are not generated. The magnetic flux on the left side of the Y axis and the magnetic flux on the right side of the Y axis are generated in opposite directions. Also, the magnetic flux above the X axis and the magnetic flux under the X axis are generated in opposite directions.

In such a configuration, if the Hall element 5 is displaced in the Y direction, the intensity and the vector of the magnetic flux density are varied. Therefore, the vector of the magnetic flux density is continuously changed, and is not uniform. Accordingly, if the position of the Hall element 5 relative to the first through fourth magnets 291 through 294 is displaced in the Y direction, the magnetic flux density detected by the Half element 5 is changed, and thus it is difficult to maintain a detection characteristic. That is, the robustness is insufficient.

In the fourth embodiment, on the other hand, the repellent of the magnetic fluxes is utilized by arranging the magnets to have opposing polarities. That is, the magnetic fluxes are generated line-symmetric with respect to the X axis and the Y axis. Therefore, the vectors of the magnetic fluxes are uniform along the stroke direction. In addition to this, since the magnetosensitive surface 5a of the Hall element 5 is faced in the direction along the stroke direction, the robustness of the stroke amount detecting device to the positional displacement improves. Accordingly, the fourth embodiment provides the effective advantageous effects, which cannot be achieved by the comparative example.

Fifth Embodiment

A fifth embodiment will be described with reference to FIGS. 11 through 13C.

Figure 11:
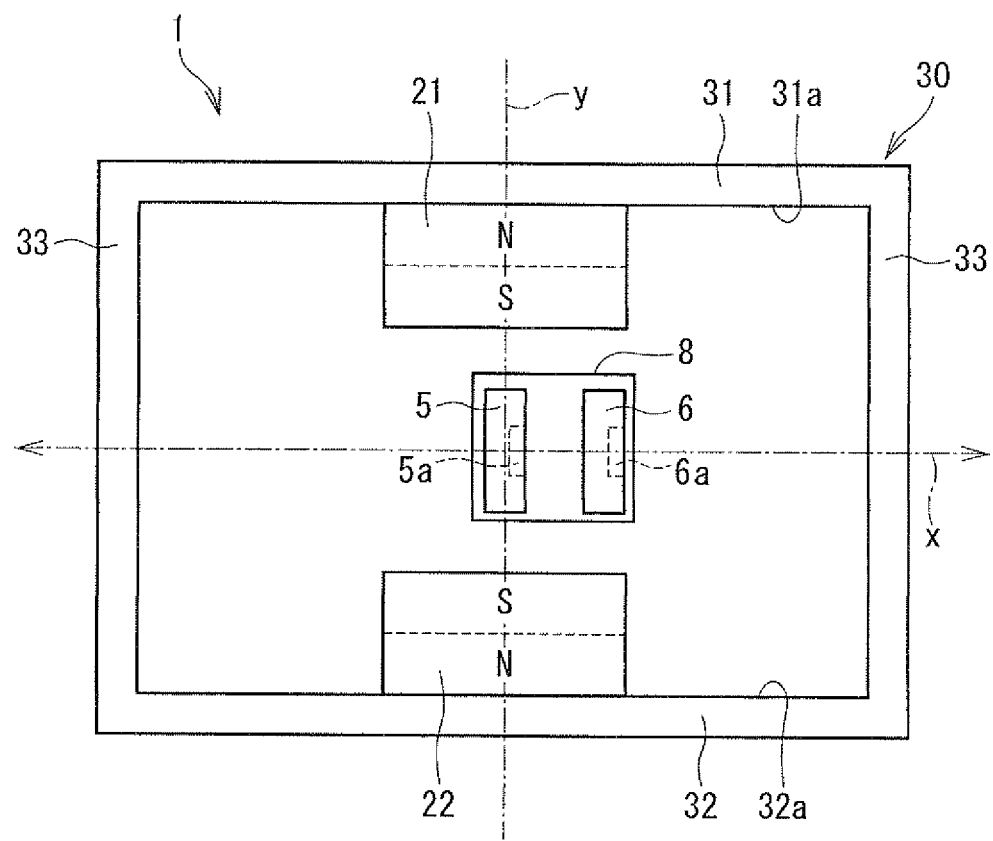
FIG. 11 is a schematic view of a stroke amount detecting device according to a fifth embodiment of the present invention.

Referring to FIG. 11, in the stroke amount detecting device 1 according to the fifth embodiment, the magnetic sensor unit has two Hall elements. Other structures are similar to the first embodiment.

For example, a single Hall IC chip 8 include a first Hall element 5 as an example of a first sensor element and a second Hall element 6 as an example of second sensor element. The first Hall element 5 and the second Hall element 6 are spaced from each other by a predetermined distance in the X direction. The magnetosensitive surface 5a of the first Hall element 5 and the magnetosensitive surface 6a of the second Hal element 6 both face a direction along the X direction. The Hall IC chip 8 corresponds to a semiconductor chip.

Figure 12:
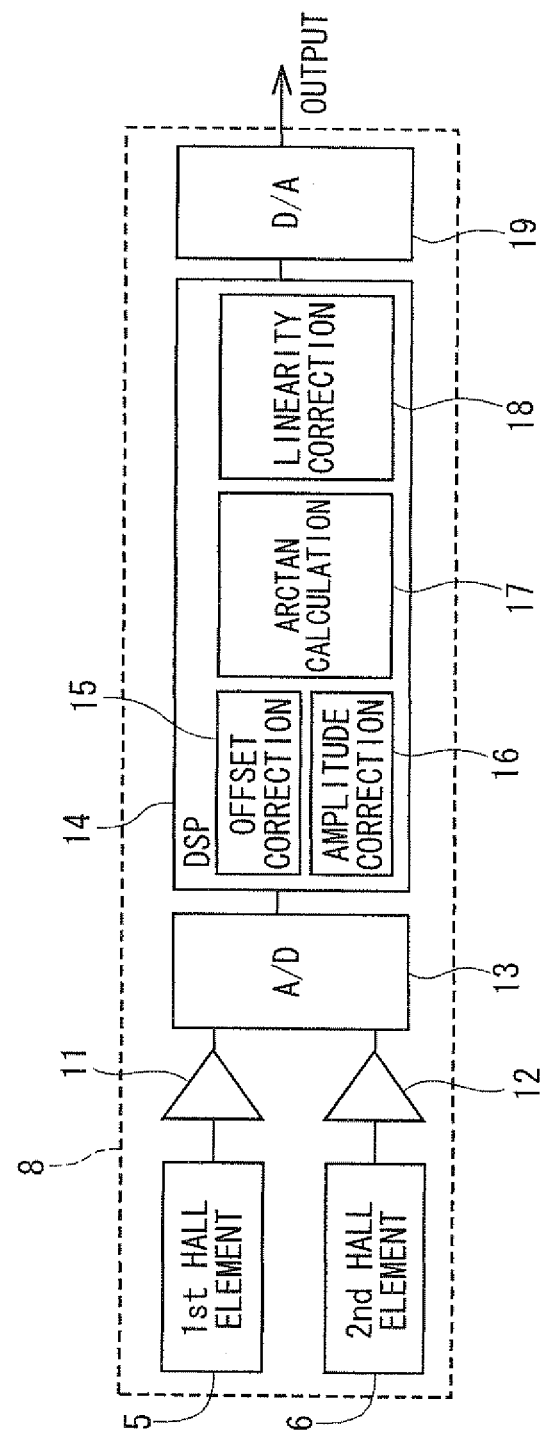
FIG. 12 is a schematic block diagram of a circuit of a Hall IC chip of the stroke amount detecting device according to the fifth embodiment.

Referring to FIG. 12, the Hall IC chip 8 includes the first Hall element 5, the second Hall element 6, a first amplifier circuit 11 for amplifying an output signal of the first Hall element 5, a second amplifier circuit 12 for amplifying an output signal of the second Hall element 6, an A/D converter circuit 13 for converting two amplified analog signals into digital signals, a signal processing part 14 for processing the two digital signals converted by the A/D converter 13, a D/A converter circuit 19 for converting digital values outputted from the signal processing unit 14 into analog values, and the like.

The signal processing unit 14 is, for example, constructed of a digital signal processor (DSP), and includes an offset correction circuit 15, an amplitude correction circuit 16, a calculation circuit 17 for generating a calculation stroke amount by a trigonometric function operation from the output signals of the first Hall element 5 and the second Hall element 6, a linearity correction circuit 18 for correcting linearity of the calculated stroke amount generated by the calculation circuit 17 relative to the stroke amount, and the like. The calculation circuit 17 serves as a calculation section.

Next, the trigonometric function operation conducted by the calculation circuit 17 will be described.

First, numerals are defined as follows, and in which "(t)" means to have a temperature characteristic with regard to an ambient temperature t:

V1: output voltage (mV) of the first Hall element 5
V2: output voltage (mV) of the second Hall element 6
K(t): Hall coefficient (−)
I(t): Hall current (mA)

B(t): maximum value of detectable magnetic flux density (½ of amplitude of sinusoidal wave) (mT)

B1(t): magnetic flux density (mT) detected by the first Hall element 5

B2(t): magnetic flux density (mT) detected by the second Hall element 6

L: stroke amount (mm)

e: phase difference (mm) between the first Hall element 5 and the second Hall element 6 (an element distance between the first Hall element 5 and the second Hall element 6)

d: reference stroke amount (mm)

The reference stroke amount d (mm) is the stroke amount corresponding to ½ of a cycle of the sinusoidal wave, that is, π (rad). If the stroke range is adjusted in a range between −d and +d (mm), the stroke range per angular unit is in a range between −π and +π (rad). Based on this relation, the stroke amount L (mm) is converted into πL/d (rad).

The output voltage V1 of the first Hall element 5 and the output voltage V2 of the second Hall element 6 are expressed as the following expressions (1) and (2):

$$V1 = K(t) \cdot I(t) \cdot B1(t) = K(t) \cdot I(t) \cdot B(t) \cdot \sin(\pi L/d) \quad (1)$$

$$V2 = K(t) \cdot I(t) \cdot B2(t) = K(t) \cdot I(t) \cdot B(t) \cdot \sin\{\pi(L-e)/d\} \quad (2)$$

In this way, the output voltages V1, V2 of the first and second Hall elements 5, 6 depend on the ambient temperature t. Therefore, to correct the output voltage V1, V2 based on the temperature characteristics of the Hall coefficient K(t), the Hall current I(t), the magnetic flux density B(t) by measuring the ambient temperature t, a complicated correction circuit is necessary.

Thus, terms depending on the ambient temperature t are eliminated to cancel the temperature characteristics by the following expressions (3), (4), which are introduced from the expressions (1), (2):

$$L = (d/\pi) \cdot \arctan\{\cot(\pi e/2d) \cdot Cv\} \quad (3)$$

$$Cv = (V1 - V2)/(V1 + V2) \quad (4)$$

Particularly, in a case where e=d/2, the following expression (5) is introduced:

$$L = (d/\pi) \cdot \arctan(V1/V2) \quad (5)$$

The calculation stroke amount is obtained by adding an offset amount according to the element distance e to the calculation result by the above expression.

Figure 13A:
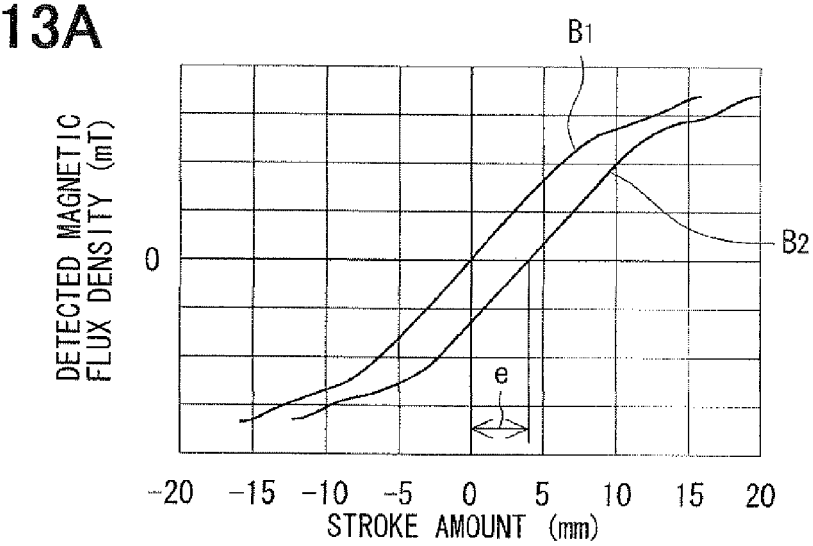
FIG. 13A is a graph showing magnetic flux densities detected by Hall elements of the stroke amount detecting device according to the fifth embodiment.

FIG. 13A shows magnetic flux densities B1, B2 detected by the first and second Hall elements 5, 6, respectively. In the example shown in FIG. 13A, the element distance e is adjusted to approximately 4 mm. The magnetic flux density B2 detected by the second Hall element 6 is approximate to a sinusoidal wave that retards from the magnetic flux density B1 detected by the first Hall element 5 by an angle of πe/d (rad) corresponding to the element distance e (mm).

Figure 13B:
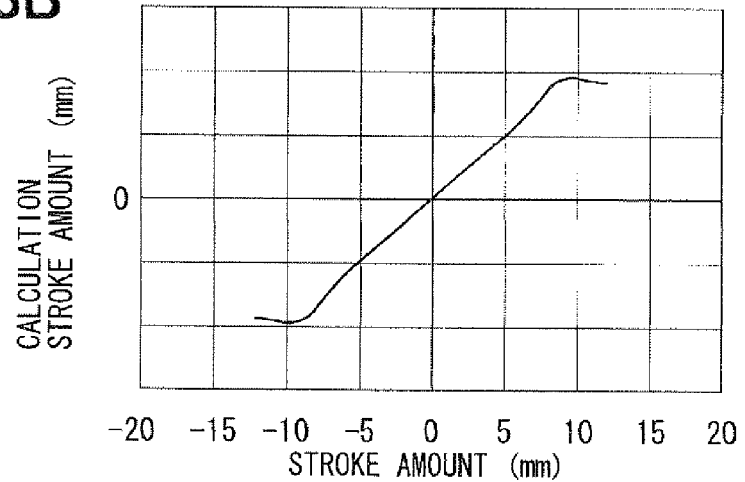
FIG. 13B is a graph showing a calculation stroke amount calculated from the magnetic flux densities shown in FIG. 13A by a trigonometric function operation according to the fifth embodiment.
Figure 13C:
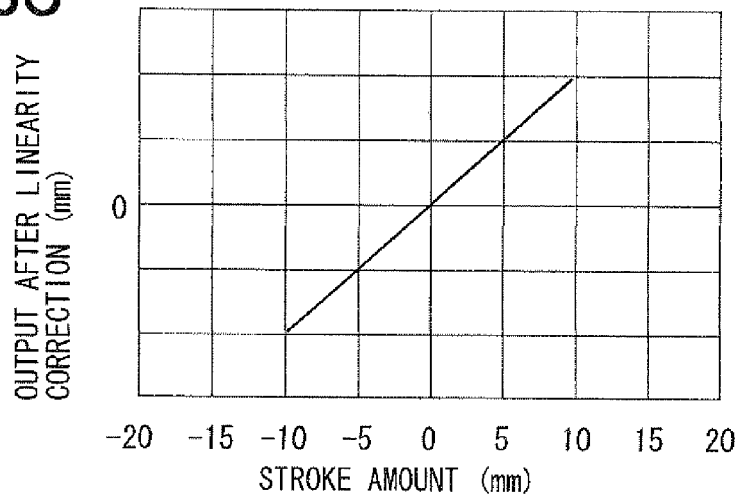
FIG. 13C is a graph showing an output generated by correcting linearity of the calculated stroke amount shown in FIG. 13B according to the fifth embodiment.

The calculation circuit 17 calculates a calculation stroke amount, as shown in FIG. 13B, based on the detected magnetic flux densities B1, B2. The linear correction circuit 18 corrects linearity of the calculation stroke amount to generate a linearly corrected output as shown in FIG. 13C.

In the fifth embodiment, the following advantageous effects (7) and (8) are achieved, in addition to the advantageous effects (1) through (6) of the first embodiment.

(7) The magnetic sensor unit has the two Hall elements 5, 6 and the calculation circuit 17 conducts the trigonometric function operation. Therefore, since the temperature characteristics of the output voltages V1, V2 can be cancelled, detection accuracy can be improved with a simple structure. In addition, the linearity correction circuit 18 corrects the linearity of the calculation stroke amount. Therefore, because the linearity is not highly required to the magnetic flux densities detected by the Hall elements 5, 6, the shape and the arrangement of the first and second magnets 21, 22 can be simplified.

(8) The first Hall element 5, the second Hall element 6, the calculation circuit 17 and the linearity correction circuit 18 are included in the single Hall IC chip 8. With this, since the first Hall element 5 and the second Hall element 6 are arranged adjacent to each other, the magnetic characteristics due to effects such as the ambient temperature t and other magnetic fields can be equalized between the first Hall element 5 and the second Hall element 6. Therefore, detection accuracy further improves. Moreover, an overall size of the magnetic sensor unit reduces, and mountability improves.

Sixth Embodiment

Figure 14:
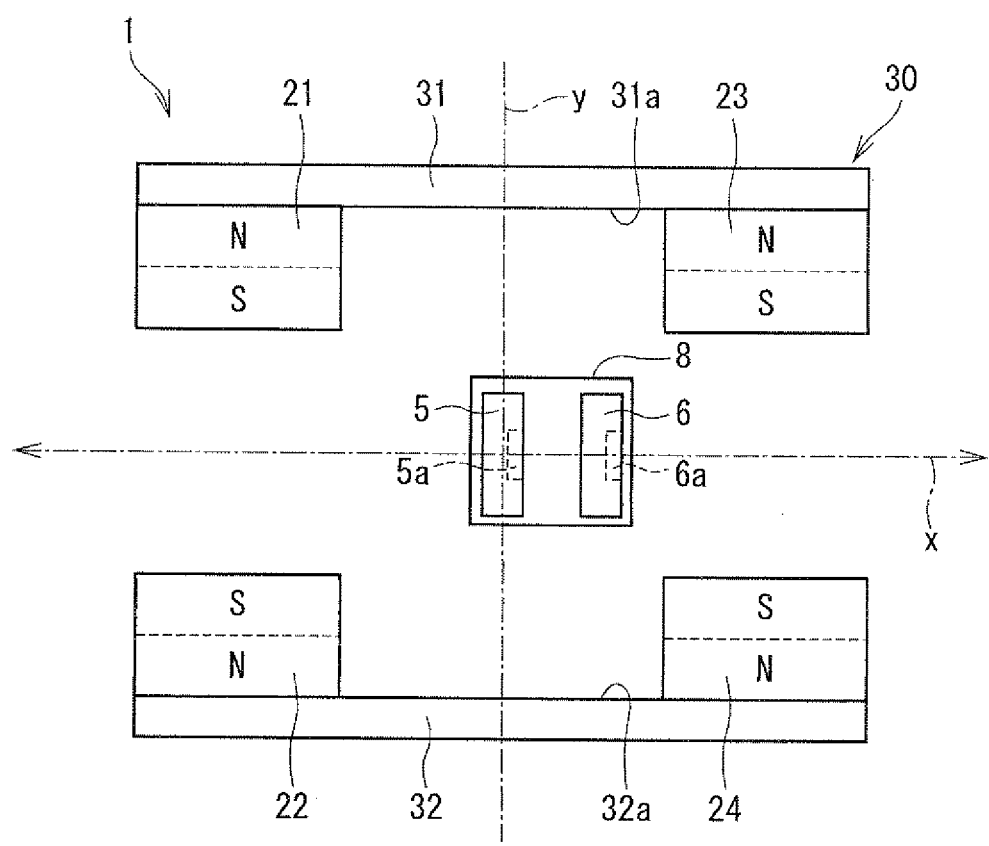
FIG. 14 is a schematic view of a stroke amount detecting device according to a sixth embodiment of the present invention.

A sixth embodiment will be described with reference to FIG. 14.

In the stroke amount detecting device 1 according to the sixth embodiment, the first through fourth magnets 21 through 24 are arranged in the similar manner to the fourth embodiment, and the magnetic sensor unit includes the two Hall elements 5, 6, similar to the fifth embodiment. Thus, the structure of the Hall IC chip 8 is similar to that of the fifth embodiment.

Figure 15A:
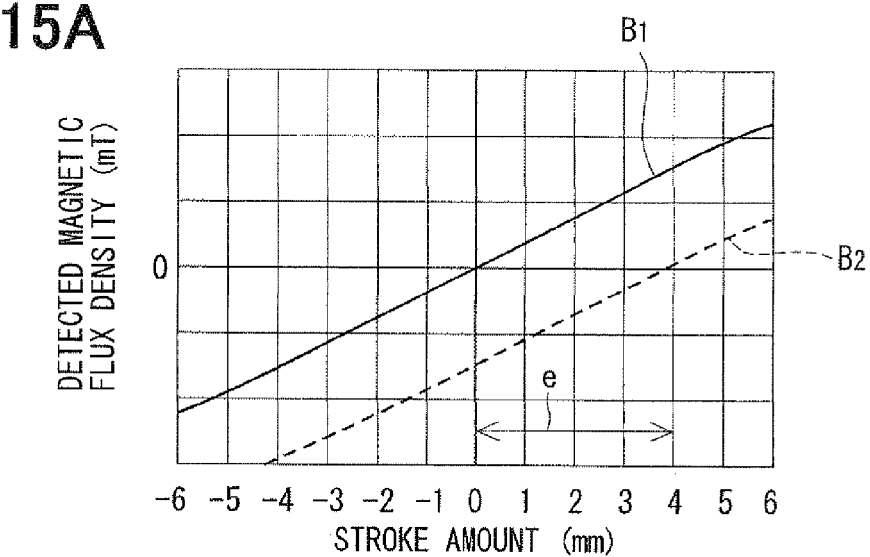
FIG. 15A is a graph showing magnetic flux densities detected by Hall elements of the stroke amount detecting device according to the sixth embodiment.

FIG. 15A shows magnetic flux densities B1, B2 detected by the first and second Hall elements 5, 6, respectively. In the example shown in FIG. 15A, the element distance e is adjusted to approximately 4 mm. The magnetic flux density B2 detected by the second Hall element 6 is approximate to a sinusoidal wave that retards from the magnetic flux density B1 detected by the first Hall element 5 by an angle of πe/d (rad) corresponding to the element distance e (mm).

Figure 15B:
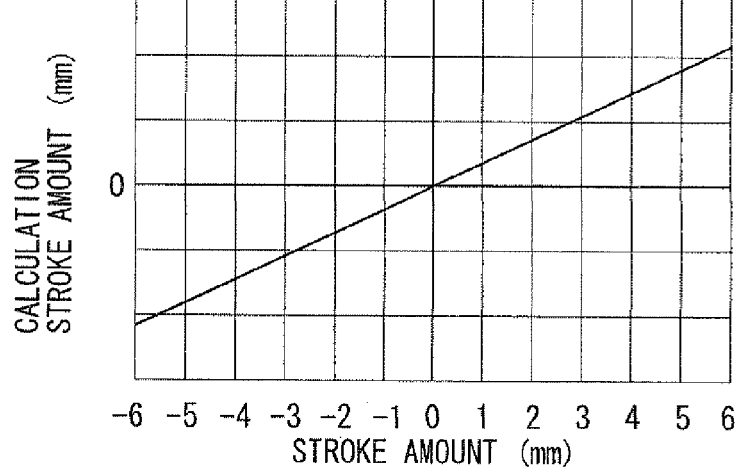
FIG. 15B is a graph showing a calculation stroke amount calculated from the magnetic flux densities shown in FIG. 15A by a trigonometric function operation according to the sixth embodiment.
Figure 15C:
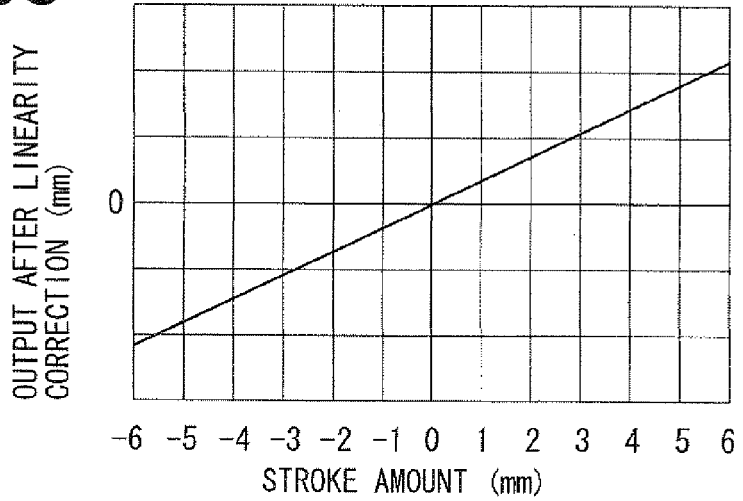
FIG. 15C is a graph showing an output generated by correcting linearity of the calculation stroke amount shown in FIG. 15B is corrected according to the fifth embodiment.

The calculation circuit 17 calculates a calculation stroke amount, as shown in FIG. 15B, based on the detected magnetic flux densities B1, B2. The linear correction circuit 18 corrects linearity of the calculation stroke amount to generate a linearly corrected output as shown in FIG. 15C.

Thus, in the sixth embodiment, the advantageous effects similar to those of the fifth embodiment are achieved.

Figure 16A:
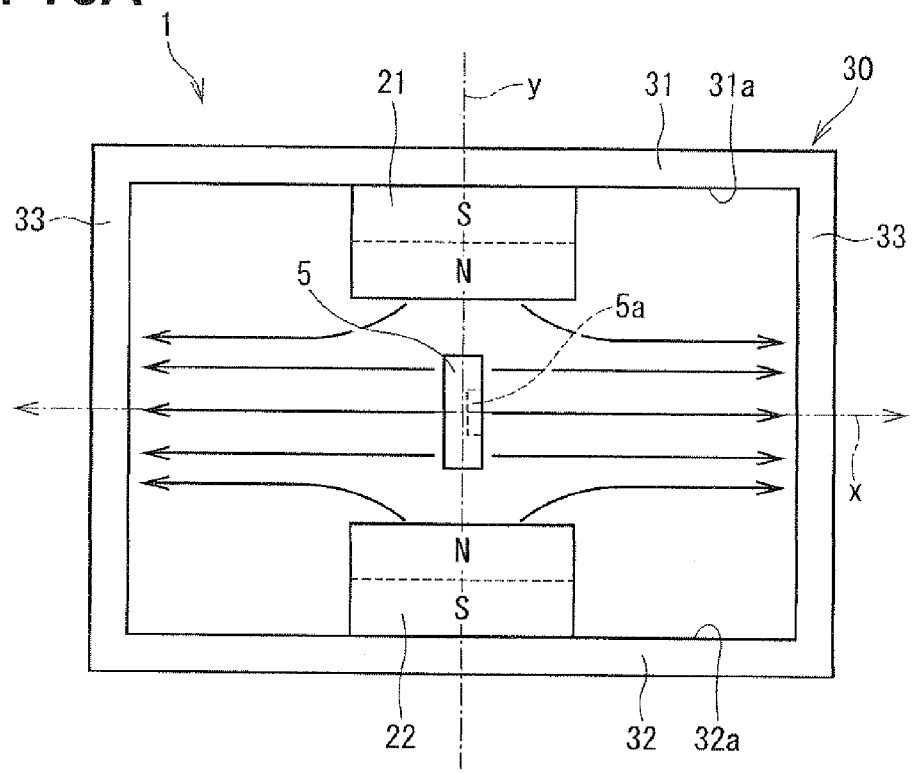
FIG. 16A is a schematic view of a stroke amount detecting device according to a first modification of the present invention.

Other Embodiments (i) In the first, second, third and fifth embodiments, the first magnet 21 and the second magnet 22 are arranged such that the south poles thereof are opposed to each other. Alternatively, as shown in FIG. 16A, the first magnet 21 and the second magnet 22 can be arranged such that the north poles thereof are opposed to each other. In such a case, although the direction of the magnetic fluxes is different from that of the first, second, third and fifth embodiments, the magnetic fluxes are repelled and thus the vectors of the magnetic fluxes are uniform in the stroke direction. Thus, the similar advantageous effects can be achieved.

Also in the structure having four magnets, that is, in the structures of the fourth and sixth embodiments, the magnets can be arranged in the opposite direction. For example, in the fourth embodiment, the first magnet 21 and the second magnet 22 can be arranged such that the north poles thereof are opposed to each other, and the third magnet 23 and the fourth magnet 24 can be arranged such that the north poles thereof are opposed to each other. Also in such a structure, the similar advantageous effects can be achieved.

Figure 16B:
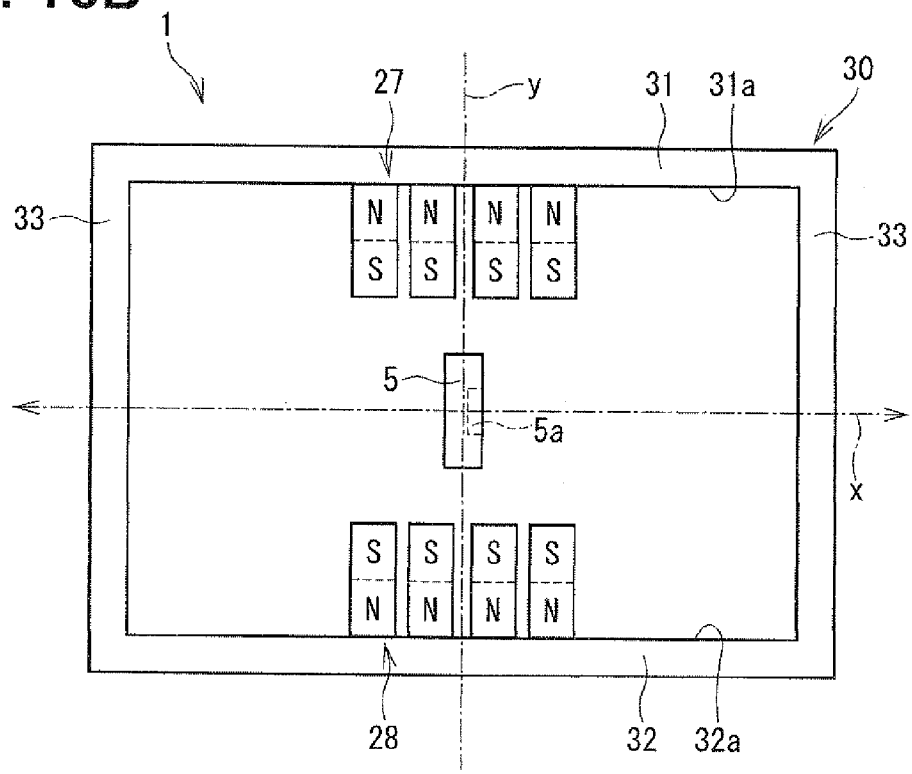
FIG. 16B is a schematic view of a stroke amount detecting device according to a second modification of the present invention.

(ii) In the above embodiments, each magnetic field generation member is constructed of the single magnet. Alternatively, as shown in FIG. 16B, each magnetic field generation member can be constructed of a magnet group including multiple magnets 27, 28. The multiple magnets 27, 28 of each magnet group are magnetized in the same direction. That is, in each magnet group, the multiple magnets are arranged such that the same magnetic polarity are adjacent to each other. In this way, the size of the magnetic field generation member can be suitably adjusted by employing small magnets, which are in standard size, and thus it is easy to cope with variations in the stroke range. Accordingly, designing flexibility improves.

Also in the case where the four magnetic field generation members are employed, as in the fourth and sixth embodiments, each of the four magnetic field generation members can be constructed of the magnet group including multiple magnets 27, 28. Also in such a case, the similar advantageous effects can be achieved.

Figure 17A:
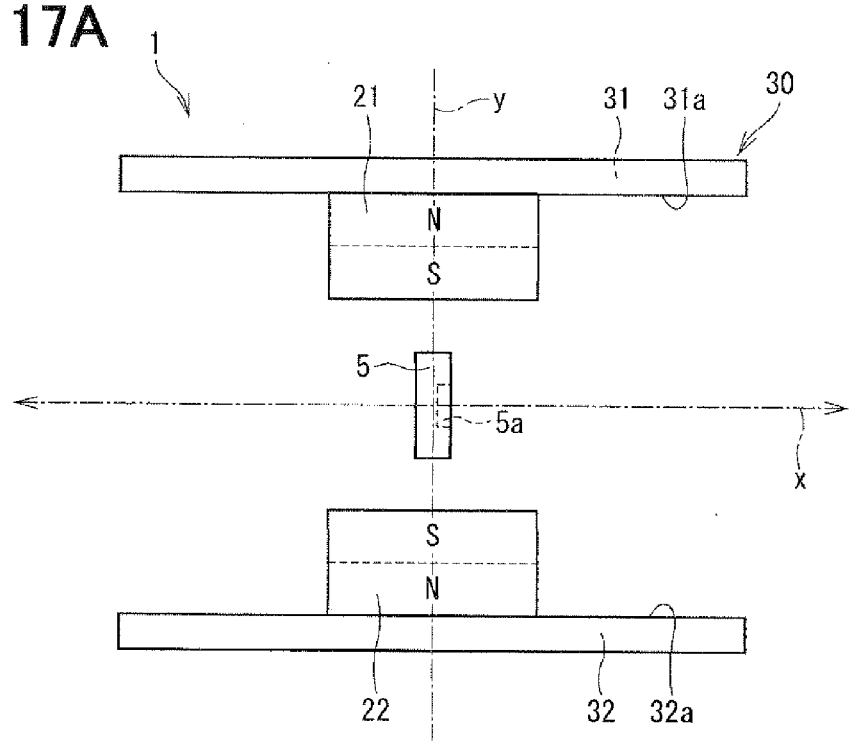
FIG. 17A is a schematic view of a stroke amount detecting device according to a third modification of the present invention.
Figure 17B:
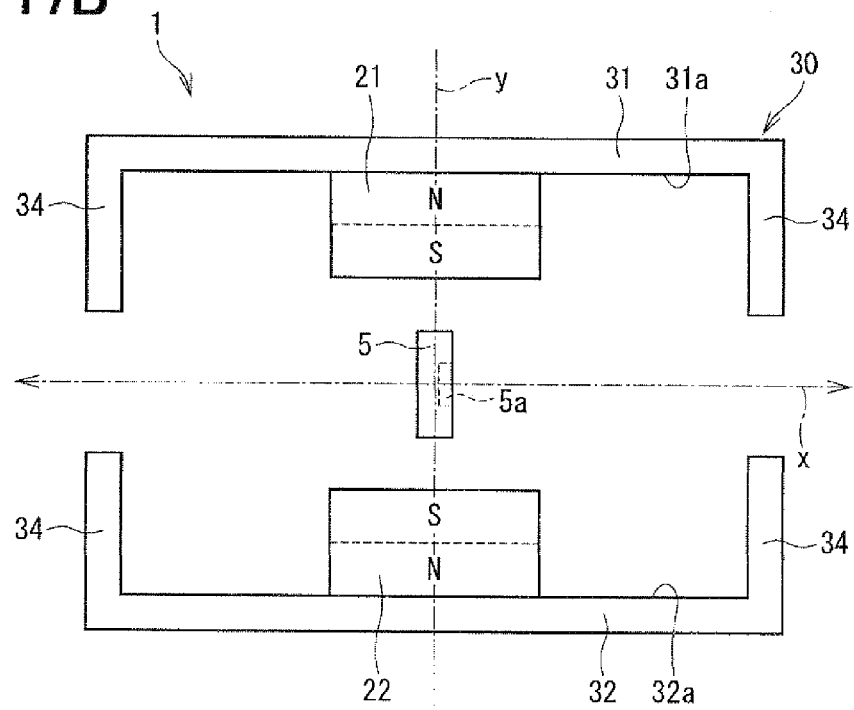
FIG. 17B is a schematic view of a stroke amount detecting device according to a fourth modification of the present invention.

(iii) In the embodiments employing two magnets as the magnetic field generation members, the cross-sectional shape of the yoke 30 is not limited to the rectangular shape. For example, as shown in FIG. 17A, the yoke 30 can be constructed of only the first wall 31 and the second wall 32. As another example, as shown in FIG. 17B, the yoke 30 can be constructed of two U-shaped parts, each having the main wall 31, 32 and side walls 34 extending from the ends of the main wall 31, 32. Each of the side walls 34 has a length less than a half of a distance between the first main wall 31 and the second main wall 32. The two U-shaped parts are arranged such that the side walls thereof are aligned to each other. In such a case, since the side walls do not exist on the X axis, even if the Hall element 5 is undesirably overstroked in the X direction, the Hall element 5 does not collide with the side walls 34 of the yoke 30. Therefore, damage to the Hall element 5 reduces.

Figure 18A:
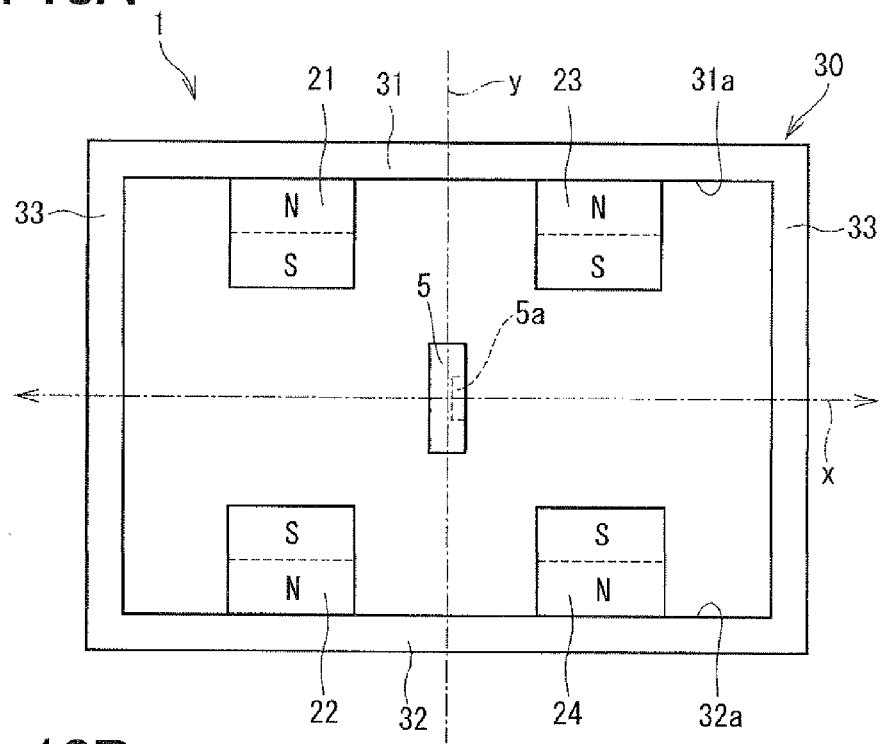
FIG. 18A is a schematic view of a stroke amount detecting device according to a fifth modification of the present invention.
Figure 18B:
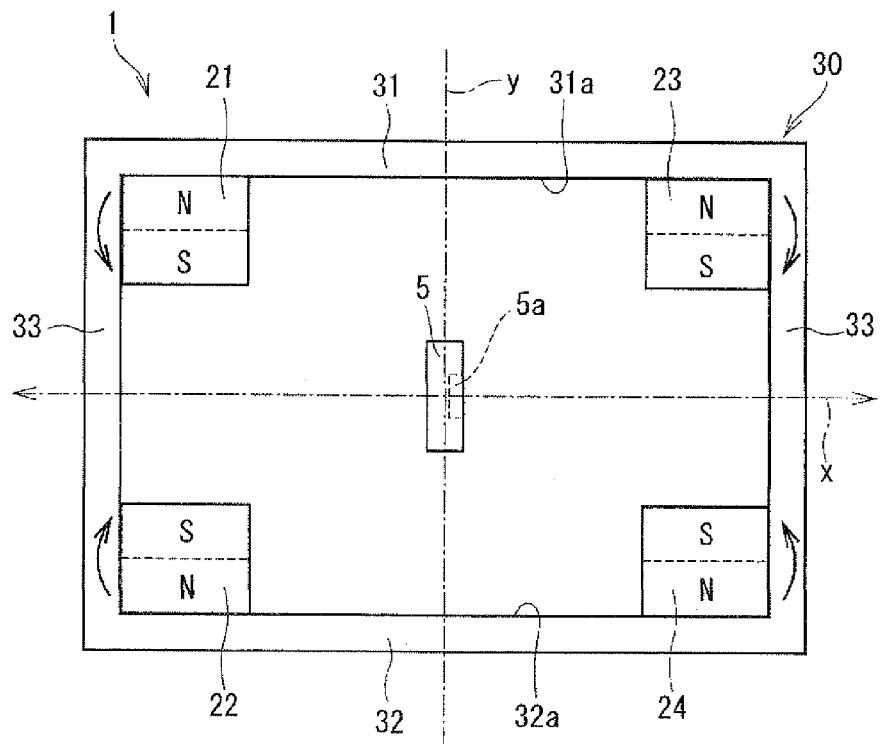
FIG. 18B is a schematic view of a stroke amount detecting device as a comparative example to the fifth modification.

(iv) In the embodiments employing the four magnets, the yoke 30 is not limited to the shape constructed of only the two walls 31, 32. For example, as shown in FIG. 18A, the yoke 30 can have a rectangular frame shape. In such a case, the first through fourth magnets 21 through 24 need to be spaced from the side walls 33 by a predetermined distance. If the first through fourth magnets 21 through 24 are adjacent to the side walls 33, as shown in FIG. 18B, the magnetic fluxes short-circuit through the side walls 33. In such a case, therefore, it is difficult to generate the magnetic flux sufficient to be detected by the Hall element 5.

Additional advantages and modifications will readily occur to those skilled in the art. The invention in its broader term is therefore not limited to the specific details, representative apparatus, and illustrative examples shown and described. The invention can be implemented by combining the exemplary embodiments in various other ways.

What is claimed is:

1. A stroke amount detecting device for detecting an amount of stroke of a detection object that moves straight, comprising:
    a first magnetic field generation member;
    a second magnetic field generation member opposed to the first magnetic field generation member with respect to a direction perpendicular to a stroke direction of the detection object, the first magnetic field generation member and the second magnetic field generation member magnetized such that opposing magnetic poles have a same magnetic polarity;
    a third magnetic field generation member disposed apart from the first magnetic field generation member by a predetermined distance across a space with respect to the stroke direction, the third magnetic field generation member magnetized in a same direction as the first magnetic field generation member with respect to the direction perpendicular to the stroke direction;
    a fourth magnetic field generation member disposed apart from the second magnetic field generation member by a predetermined distance across a space with respect to the stroke direction, and opposed to the third magnetic field generation member with respect to the direction perpendicular to the stroke direction, the fourth magnetic field generation member magnetized in a same direction as the second magnetic field generation member with respect to the direction perpendicular to the stroke direction; and
    a magnetic sensor unit disposed in an area between the first magnetic field generation member or the third magnetic field generation member and the second magnetic field generation member or the fourth magnetic field generation member with respect to the direction perpendicular to the stroke direction, the magnetic sensor unit moving relative to the first to fourth magnetic field generation members along a straight traveling axis in accordance with a stroke motion of the detection object, the magnetic sensor unit including a magnetosensitive surface facing in the stroke direction to detect an amount of stroke of the detection object; wherein
    the magnetic sensor unit includes a first magnetic sensor element outputting a signal according to a change in a magnetic field caused as traveling relative to the first magnetic field generation member, the second magnetic field generation member, the third magnetic field generation member and the fourth magnetic field generation member; and
    the magnetic sensor unit further includes a linearity correction element that corrects a magnetic flux density detected by the first magnetic sensor element so that the magnetic flux density detected by the first magnetic sensor element varies linearly relative to an amount of stroke of the detection object.

2. The stroke amount detecting device according to claim 1, wherein
    the magnetic sensor unit moves relative to the first to fourth magnetic field generation members along a straight line that is equidistant from the first magnetic field generation member and the second magnetic field generation member and equidistant from the third magnetic field generation member and the fourth magnetic field generation member.

3. The stroke amount detecting device according to claim 1, further comprising:
    a magnetic flux transmission member made of a magnetic material and including a first wall and a second wall, wherein
    the first wall is parallel to the straight traveling axis,
    the second wall is parallel to the straight traveling axis and opposite to the first wall with respect to the straight traveling axis,
    the first magnetic field generation member and the third magnetic field generation member are disposed along an inner surface of the first wall, and
    the second magnetic field generation member and the fourth magnetic field generation member are disposed along an inner surface of the second wall.

4. The stroke amount detecting device according to claim 3, wherein
    the first magnetic field generation member and the third magnetic field generation member are disposed symmetric with respect to a straight line passing through a middle point of the first wall with respect to the stroke direction, and adjacent to ends of the first wall, and the second magnetic field generation member and the fourth magnetic field generation member are disposed symmetric with respect to a straight line passing through a middle point of the second wall with respect to the stroke direction, and adjacent to ends of the second wall.

5. The stroke amount detecting device according to claim 3, wherein the magnetic flux transmission member includes side walls at opposite ends of the first wall and the second wall with respect to the stroke direction, the side walls are perpendicular to the straight traveling axis, and each of the first magnetic field generation member, the second magnetic field generation member, the third magnetic field generation member and the fourth magnetic field generation member is spaced from the corresponding side wall by a predetermined distance.

6. The stroke amount detecting device according to claim 1, wherein the first magnetic field generation member, the second magnetic field generation member, the third magnetic field generation member and the fourth magnetic field generation member have an identical shape and an identical magnetic property.

7. The stroke amount detecting device according to claim 6, wherein each of the first magnetic field generation member, the second magnetic field generation member, the third magnetic field generation member and the fourth magnetic field generation member has a rectangular parallelepiped shape.

8. The stroke amount detecting device according to claim 6, wherein each of the first magnetic field generation member, the second magnetic field generation member, the third magnetic field generation member and the fourth magnetic field generation member is constructed of a magnet group including a plurality of separate magnets, and the plurality of separate magnets in each magnet group are disposed such that magnetic poles having the same magnetic polarity are adjacent to each other.

9. The stroke amount detecting device according to claim 1, wherein the first magnetic sensor element and the linearity correction element are included in a single semiconductor chip.

10. The stroke amount detecting device according to claim 1, wherein the first magnetic sensor element is a Hall element.

11. A stroke amount detecting device for detecting an amount of stroke of a detection object that moves straight, comprising:

a first magnetic field generation member;

a second magnetic field generation member opposed to the first magnetic field generation member with respect to a direction perpendicular to a stroke direction of the detection object, the first magnetic field generation member and the second magnetic field generation member magnetized such that opposing magnetic poles have a same magnetic polarity;

a third magnetic field generation member disposed apart from the first magnetic field generation member by a predetermined distance across a space with respect to the stroke direction, the third magnetic field generation member magnetized in a same direction as the first magnetic field generation member with respect to the direction perpendicular to the stroke direction;

a fourth magnetic field generation member disposed apart from the second magnetic field generation member by a predetermined distance across a space with respect to the stroke direction, and opposed to the third magnetic field generation member with respect to the direction perpendicular to the stroke direction, the fourth magnetic field generation member magnetized in a same direction as the second magnetic field generation member with respect to the direction perpendicular to the stroke direction; and a magnetic sensor unit disposed in an area between the first magnetic field generation member or the third magnetic field generation member and the second magnetic field generation member or the fourth magnetic field generation member with respect to the direction perpendicular to the stroke direction, the magnetic sensor unit moving relative to the first to fourth magnetic field generation members along a straight traveling axis in accordance with a stroke motion of the detection object, the magnetic sensor unit including a magnetosensitive surface facing in the stroke direction to detect an amount of stroke of the detection object; wherein:

the magnetic sensor unit includes a first magnetic sensor element outputting a signal according to a chance in a magnetic field caused as traveling relative to the first magnetic field generation member, the second magnetic field generation member, the third magnetic field generation member and the fourth magnetic field generation member; and the magnetic sensor unit further includes:

a second magnetic sensor element that is spaced from the first magnetic sensor element by a predetermined distance in a direction parallel to the straight traveling axis, and has a magnetic property identical to that of the first magnetic sensor element; and a calculation element that calculates the amount of stroke of the detection object by a trigonometric function operation based on output signals from the first magnetic sensor element and the second magnetic sensor element.

12. The stroke amount detecting device according to claim 11, wherein the magnetic sensor unit includes a linearity correction element that corrects the amount of stroke calculated by the calculation element so that the amount of stroke calculated varies linearly relative to an amount of stroke of the detection object.

13. The stroke amount detecting device according to claim 12, wherein the first magnetic sensor element, the second magnetic sensor element, the calculation element, and the linearity correction element are included in a single semiconductor chip.

14. The stroke amount detecting device according to claim 11, wherein the first magnetic sensor element and the second magnetic sensor element are Hall elements, respectively.

15. A stroke amount detecting device for detecting an amount of stroke of a detection object that moves straight, comprising:

a first magnetic field generation member;

a second magnetic field generation member opposed to the first magnetic field generation member with respect to a direction perpendicular to a stroke direction of the detection object, the second magnetic field generation member and the first magnetic field generation member magnetized such that opposing magnetic poles have a same magnetic polarity;

a magnetic sensor unit disposed in an area between the first magnetic field generation member and the second magnetic field generation member with respect to the direction perpendicular to the stroke direction, and moving along a straight traveling axis relative to the first magnetic field generation member and the second magnetic field generation member in accordance with a stroke motion of the detection object, the magnetic sensor unit including a magnetosensitive surface facing in the stroke direction to detect an amount of stroke of the detection object; and a magnetic flux transmission member made of a magnetic material and including a first wall and a second wall, wherein the first wall and the second wall are disposed on opposite sides of the straight traveling axis, the first magnetic field generation member is disposed along an inner surface of the first wall, the second magnetic field generation member is disposed along an inner surface of the second wall, an intersection point of the straight traveling axis with a line, which passes through a center of the first wall with respect to the stroke direction and a center of the second wall with respect to the stroke direction and is perpendicular to the straight traveling axis, is referred to as a zero point of an amount of stroke, a stroke range of the detection object is biased toward a negative side of the stroke direction from the zero point of the amount of stroke, the first magnetic field generation member and the second magnetic field generation member are offset from the zero point of the amount of stroke to the negative side of the stroke direction, the magnetic sensor unit includes a first magnetic sensor element outputting a signal according to a change in a magnetic field caused as traveling relative to the first magnetic field generation member and the second magnetic field generation member, and the magnetic sensor unit further includes a linearity correction element that corrects a magnetic flux density detected by the first magnetic sensor element so that the magnetic flux density detected by the first magnetic sensor element varies linearly relative to an amount of stroke of the detection object.

16. The stroke amount detecting device according to claim 15, wherein
the magnetic sensor unit moves relative to the first magnetic field generation member and the second magnetic field generation member along a straight line that is equidistant from the first magnetic field generation member and the second magnetic field generation member.

17. The stroke amount detecting device according to claim 15, wherein
the first wall and the second wall are disposed parallel to the straight traveling axis.

18. The stroke amount detecting device according to claim 17, wherein
the magnetic flux transmission member includes side walls at ends of the first wall and the second wall with respect to the stroke direction, and
the side walls are perpendicular to the straight traveling axis.

19. The stroke amount detecting device according to claim 15, wherein
the first magnetic field generation member is disposed at a middle position of the first wall with respect to a direction parallel to the straight traveling axis, and
the second magnetic field generation member is disposed at a middle position of the second wall with respect to the direction parallel to the straight traveling axis.

20. The stroke amount detecting device according to claim 15, wherein
the first magnetic field generation member and the second magnetic field generation member have an identical shape and an identical magnetic property.

21. The stroke amount detecting device according to claim 20, wherein
each of the first magnetic field generation member and the second magnetic field generation member has a rectangular parallelepiped shape.

22. The stroke amount detecting device according to claim 20, wherein
each of the first magnetic field generation member and the second magnetic field generation member has a depressed shape including a thin portion at a middle and thick portions at opposite sides of the thin portion with respect to the stroke direction such that a distance between the thin portion and the straight traveling axis is greater than a distance between the thick portions and the traveling axis with respect to a direction perpendicular to the straight traveling axis.

23. The stroke amount detecting device according to claim 20, wherein
each of the first magnetic field generation member and the second magnetic field generation member is constructed of a magnet group including a plurality of separate magnets, and
the plurality of separate magnets in each magnet group are disposed such that magnetic poles having the same magnetic polarity are adjacent to each other.

24. The stroke amount detecting device according to claim 15, wherein
the first magnetic sensor element and the linearity correction element are included in a single semiconductor chip.

25. The stroke amount detecting device according to claim 15, wherein
the first magnetic sensor element is a Hall element.

26. A stroke amount detecting device for detecting an amount of stroke of a detection object that moves straight, comprising:
a first magnetic field generation member;
a second magnetic field generation member opposed to the first magnetic field generation member with respect to a direction perpendicular to a stroke direction of the detection object, the second magnetic field generation member and the first magnetic field generation member magnetized such that opposing magnetic soles have a same magnetic polarity;
a magnetic sensor unit disposed in an area between the first magnetic field generation member and the second magnetic field generation member with respect to the direction perpendicular to the stroke direction, and moving along a straight traveling axis relative to the first magnetic field generation member and the second magnetic field generation member in accordance with a stroke motion of the detection object, the magnetic sensor unit including a magnetosensitive surface facing in the stroke direction to detect an amount of stroke of the detection object; and a magnetic flux transmission member made of a magnetic material and including a first wall and a second wall, wherein the first wall and the second wall are disposed on opposite sides of the straight traveling axis, the first magnetic field generation member is disposed along an inner surface of the first wall, the second magnetic field generation member is disposed along an inner surface of the second wall, an intersection point of the straight traveling axis with a line, which passes through a center of the first wall with respect to the stroke direction and a center of the second wall with respect to the stroke direction and is perpendicular to the straight traveling axis, is referred to as a zero point of an amount of stroke, a stroke range of the detection object is biased toward a negative side of the stroke direction from the zero point of the amount of stroke, the first magnetic field generation member and the second magnetic field generation member are offset from the zero point of the amount of stroke to the negative side of the stroke direction, the magnetic sensor unit includes a first magnetic sensor element outputting a signal according to a change in a magnetic field caused as traveling relative to the first magnetic field generation member and the second magnetic field generation member, and the magnetic sensor unit further includes:

a second magnetic sensor element that is spaced from the first magnetic sensor element by a predetermined distance in a direction parallel to the straight traveling axis, and has a magnetic property identical to that of the first magnetic sensor element; and a calculation element that calculates an amount of stroke of the detection object by a trigonometric function operation based on output signals from the first magnetic sensor element and the second magnetic sensor element.

27. The stroke amount detecting device according to claim 26, wherein the magnetic sensor unit includes a linearity correction element that corrects the amount of stroke calculated by the calculation element so that the amount of stroke calculated varies linearly relative to an amount of stroke of the detection object.

28. The stroke amount detecting device according to claim 27, wherein the first magnetic sensor element, the second magnetic sensor element, the calculation element, and the linearity correction element are included in a single semiconductor chip.

29. The stroke amount detecting device according to claim 26, wherein the first magnetic sensor element and the second magnetic sensor element are Hall elements, respectively.

30. A stroke amount detecting device for detecting an amount of stroke of a detection object that moves straight, comprising:

a first magnetic field generation member;

a second magnetic field generation member opposed to the first magnetic field generation member with respect to a direction perpendicular to a stroke direction of the detection object, the second magnetic field generation member and the first magnetic field generation member magnetized such that opposing magnetic poles have a same magnetic polarity; and a magnetic sensor unit disposed in an area between the first magnetic field generation member and the second magnetic field generation member with respect to the direction perpendicular to the stroke direction, and moving along a straight traveling axis relative to the first magnetic field generation member and the second magnetic field generation member in accordance with a stroke motion of the detection object, the magnetic sensor unit including a magnetosensitive surface facing in the stroke direction to detect an amount of stroke of the detection object, wherein the first magnetic field generation member and the second magnetic field generation member have an identical shape and an identical magnetic property, each of the first magnetic field generation member and the second magnetic field generation member is constructed of a magnet group including a plurality of magnets, the plurality of magnets in each magnet group are disposed such that magnetic poles having a same magnetic polarity are adjacent to each other, the magnetic sensor unit includes a first magnetic sensor element outputting a signal according to a change in a magnetic field caused as traveling relative to the first magnetic field generation member and the second magnetic field generation member, and the magnetic sensor unit further includes a linearity correction element that corrects a magnetic flux density detected by the first magnetic sensor element so that the magnetic flux density detected by the first magnetic sensor element varies linearly relative to an amount of stroke of the detection object.

* * * * *